(12) United States Patent
Arnold et al.

(10) Patent No.: US 7,473,738 B2
(45) Date of Patent: Jan. 6, 2009

(54) LACTAM POLYMER DERIVATIVES

(75) Inventors: Stephen C. Arnold, Flanders, NJ (US);
Walter R. Laredo, Hillsborough, NJ (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 194 days.

(21) Appl. No.: 10/955,214

(22) Filed: Sep. 30, 2004

(65) Prior Publication Data
US 2006/0069235 A1    Mar. 30, 2006

(51) Int. Cl.
*C08F 8/04*      (2006.01)
*C08F 26/06*     (2006.01)
*C08F 8/00*      (2006.01)
*C08G 18/83*     (2006.01)
*C09B 69/10*     (2006.01)
*C08L 101/14*    (2006.01)
*G02B 1/04*      (2006.01)

(52) U.S. Cl. ............ 525/326.9; 524/379; 524/404; 525/326.7; 525/326.8; 525/327.1; 525/337

(58) Field of Classification Search ........... 526/264; 264/2.6; 525/326.7, 326.8, 326.9, 327.1, 525/337, 379, 404
See application file for complete search history.

(56) References Cited

U.S. PATENT DOCUMENTS

| | | | |
|---|---|---|---|
| 3,408,429 A | 10/1968 | Wichterle | |
| 3,505,067 A * | 4/1970 | Dersch et al. | 430/444 |
| 3,660,545 A | 5/1972 | Wichterle | |
| 3,808,178 A | 4/1974 | Gaylord | |
| 4,018,853 A | 4/1977 | Le Boeuf et al. | |
| 4,113,224 A | 9/1978 | Clark et al. | |
| 4,120,570 A | 10/1978 | Gaylord | |
| 4,136,250 A | 1/1979 | Mueller et al. | |
| 4,153,641 A | 5/1979 | Deichert et al. | |
| 4,197,266 A | 4/1980 | Clark et al. | |
| 4,229,551 A | 10/1980 | Straub et al. | |
| 4,254,239 A | 3/1981 | Straub et al. | |
| 4,277,576 A | 7/1981 | Straub et al. | |
| 4,350,791 A | 9/1982 | Straub et al. | |
| 4,379,893 A * | 4/1983 | O'Malley et al. | 525/386 |
| 4,495,313 A | 1/1985 | Larsen | |
| 4,678,838 A | 7/1987 | Janssen | |
| 4,680,336 A | 7/1987 | Larsen et al. | |
| 4,740,533 A | 4/1988 | Su et al. | |
| 4,791,175 A | 12/1988 | Janssen | |
| 4,833,196 A | 5/1989 | Janssen | |
| 4,889,664 A * | 12/1989 | Kindt-Larsen et al. | 264/2.6 |
| 4,910,277 A | 3/1990 | Bambury et al. | |
| 5,006,622 A * | 4/1991 | Kunzler et al. | 526/309 |
| 5,034,461 A | 7/1991 | Lai et al. | |
| 5,039,459 A * | 8/1991 | Kindt-Larsen et al. | 264/2.6 |
| 5,070,215 A | 12/1991 | Bambury et al. | |
| 5,177,165 A | 1/1993 | Valint, Jr. et al. | |
| 5,198,477 A | 3/1993 | von der Haegen et al. | |
| 5,256,751 A * | 10/1993 | Vanderlaan | 526/304 |
| 5,311,223 A * | 5/1994 | Vanderlaan | 351/160 H |
| 5,321,108 A | 6/1994 | Kunzler et al. | |
| 5,364,918 A | 11/1994 | Valint, Jr. et al. | |
| 5,385,935 A | 1/1995 | Tamai et al. | |
| 5,387,662 A | 2/1995 | Kunzler et al. | |
| 5,525,691 A | 6/1996 | Valint, Jr. et al. | |
| 5,539,016 A | 7/1996 | Kunzler et al. | |
| 5,587,175 A * | 12/1996 | Viegas et al. | 424/427 |
| 5,834,274 A * | 11/1998 | Hubbell et al. | 435/177 |
| 5,858,746 A * | 1/1999 | Hubbell et al. | 435/177 |
| 6,136,334 A * | 10/2000 | Viegas et al. | 424/427 |
| 6,239,177 B1 | 5/2001 | Mori et al. | |
| 6,265,509 B1 | 7/2001 | Muller | |
| 6,367,929 B1 | 4/2002 | Maiden et al. | |
| 2003/0088307 A1 | 5/2003 | Shulze et al. | |

FOREIGN PATENT DOCUMENTS

| | | |
|---|---|---|
| EP | 0080539 B1 | 8/1983 |
| EP | 0322976 | 7/1989 |
| EP | 1235866 | 9/2002 |
| WO | WO 92/02114 | 2/1992 |
| WO | WO 96/31792 A1 | 10/1996 |
| WO | WO 03/022321 A2 | 3/2003 |
| WO | WO 03/022322 A2 | 3/2003 |

OTHER PUBLICATIONS

Crivello J.V. & Dietliker K.; vol. III, Photoinitiators for Free Radical Cationic & Anionic Photopolymerisation, 1998, 275-298, 2nd Edition by edited by G. Bradley; John Wiley and Sons; New York.
Encyclopedia of Polymer Science and Engineering, N-Vinyl Amide Polymers, Second edition, vol. 17, pp. 198-257, John Wiley & Sons Inc. and reported in K-values.
Yu, Dingsheng et al: "Formation of hydroxyl groups in plasma-polymerized N-vinyl-2-pyrrolidone by reduction with sodium borohydride" Macromolecules 1989, 22, 2957-2961.
Yuan, Shengmei; Marchant, Roger E., "Surface modification of polyethylene film by plasma polymerization and subsequent chemical derivatization", Journal of Applied Polymer Science: Applied Polymer Symposium, (Plasma Deposition of Polymeric Thin Films), 77-91 (1994).
Wickson, B.M.; Brash, J.L., Surface hydroxylation of polyethylene by plasma polymerization of allyl alcohol and subsequent silylation: Colloids and Surfaces. A: Physicochemical and Engineering Aspects, 156 (1-3), 201-213 (1999).
Ziekle, U.; Huettinger, K. J.; Hoffman, W.P., "Surface Oxidized carbon figers: II. Chemical Modification". Carbon, 34(8), 999-1005 (1996).
Tesoro, G.C.; Benrashid R.; Rebenfeld, L.; Gaur, Umesh, "Chemical modification of Kevlar fiber surfaces for improved adhesion in composites", Adv. Technol., Invited Lect. Sel. Contrib. Pap., Meeting Date 1987, 773-91 (1988).

* cited by examiner

*Primary Examiner*—Ana L Woodward

(57) ABSTRACT

Lactam polymers has been modified with sodium borohydride ($NaBH_4$) to yield lactam polymers bearing hydroxyl functional groups. These functional groups are useful for the covalent attachment of reactive groups, fluorescent probes, antimicrobial agents, bioactive factors, and drugs. The resulting as components for medical devices, specifically ophthalmic devices and more specifically contact lenses. Hydrogels based on these polymers are also useful for biomedical applications in the areas of drug delivery, tissue engineering, and implantable devices.

26 Claims, 3 Drawing Sheets

LACTAM POLYMER DERIVATIVES

FIELD OF THE INVENTION

The present invention relates to the field of lactam polymer derivatives. More particularly, the present invention relates to hydroxyl-functionalized lactam polymer derivatives, methods of making the derivatives, and their use in contact lens, tissue engineering, drug delivery, and implantable device applications.

BACKGROUND OF THE INVENTION

Poly(N-vinyl-2-pyrrolidone), also known as polyvinylpyrrolidone, PVP, Povidone, or Plasdone, is a water-soluble polymer used commercially in such products as aerosol hair sprays, adhesives, lithographic solutions, pigment dispersions, and drug, detergent, and cosmetic formulations. PVP has been used extensively in medicine since 1939. The earliest use of PVP in medicine was during World War II when a 3.5% solution of PVP was infused into patients as a synthetic blood plasma volume expander. The toxicity of PVP, extensively studied in a variety of species including humans and other primates, is extremely low. PVP has also found use as internal wetting agents in contact lens applications.

PVP film surfaces have been reduced with sodium borohydride to form hydroxyl groups on film surfaces. However, hydroxyl groups were not formed on the bulk polymer.

Poly-N-vinylpyrrolid-2-one has been modified to contain two identical reactive groups in the molecule via the free radical polymerization of N-vinylpyrrolid-2-one in the presence of hydrogen peroxide as the free radical initiator followed by treatment with a complex hydride (such as sodium boranate and lithium boranate). The highly reactive complex hydrides were employed in amounts that were low (0.5 to 5 weight percent), so the lactam group of the polyvinylpyrrolidone was not attacked. The resultant polymer was chain extended with a reactive bifunctional compound, yielding a polymer that had a molecular weight at least 2.5 times higher than that of the starting polymer.

Polyvinylpyrrolidone (PVP) has long been used in biomedical applications. PVP derivatives, such as hydroxyl-functionalized polyvinylpyrrolidone, have reactive moieties along the polymer backbone that can be reacted to form new polymers with desirable properties. There remains a need for hydroxyl-functionalized polyvinylpyrrolidones having hydroxyl moieties distributed randomly throughout the polyvinylpyrrolidone backbone.

SUMMARY OF THE INVENTION

The present invention is directed to medical compositions and devices, each comprising a hydroxyl-functionalized lactam polymer or copolymer derivative, and a method of synthesizing the polymer.

DETAILED DESCRIPTION OF THE INVENTION

Figure 1:
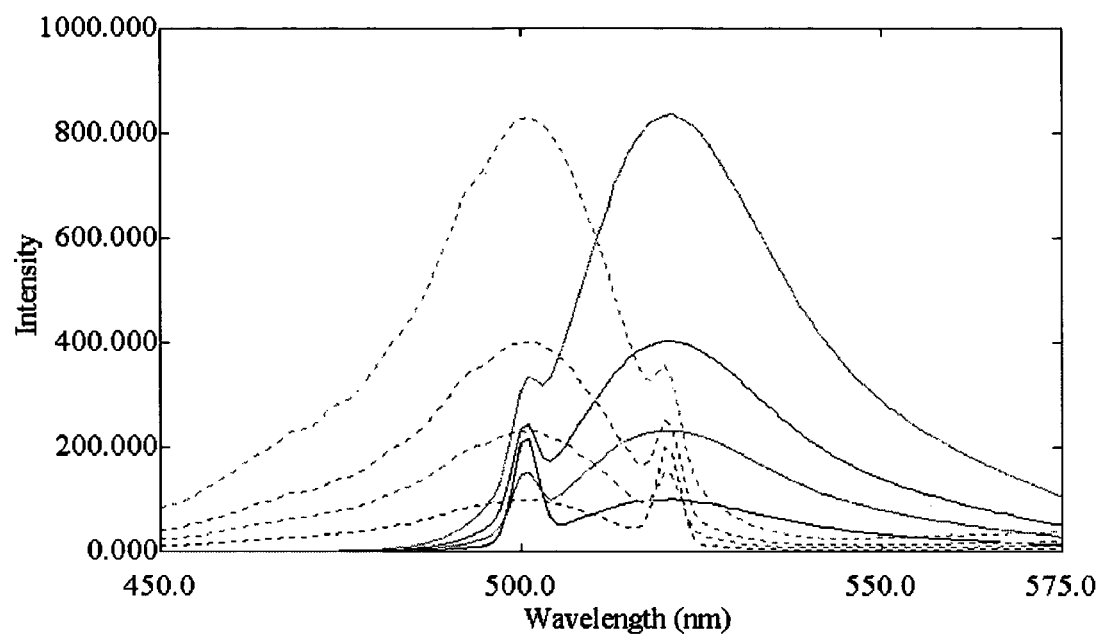
FIG. 1 is the emission spectrum for a fluorecently labeled polymer of the present invention using a fluorescein-derived fluorescent probe.

As used herein, a "biomedical device" is any article that is designed to be used while either in or on mammalian tissues or fluid, and preferably in or on human tissue or fluids. Examples of these devices include but are not limited to catheters, implants, stents, bioadhesives, sealants and ophthalmic devices such as intraocular lenses and contact lenses. The preferred biomedical devices are ophthalmic devices, particularly contact lenses, most particularly contact lenses made from silicone hydrogels.

As used herein, the terms "lens" and "ophthalmic device" refer to devices that reside in or on the eye. These devices can provide optical correction, wound care, drug delivery, diagnostic functionality, cosmetic enhancement or effect or a combination of these properties. The term lens includes but is not limited to soft contact lenses, hard contact lenses, intraocular lenses, overlay lenses, ocular inserts, and optical inserts.

As used herein, the phrase "without a surface treatment" means that the exterior surfaces of the devices of the present invention are not separately treated to improve the wettability of the device. Treatments which may be foregone because of the present invention include, plasma treatments, grafting, coating and the like. However, coatings which provide properties other than improved wettability, such as, but not limited to antimicrobial coatings and the application of color or other cosmetic enhancement may be applied to devices of the present invention.

As used herein, "macromer" is a low molecular weight polymer having at least one polymerizable end group and a degree of polymerization (DP) ranging from 10 to 1000 monomeric repeat units, which correspond to a number average molecular weight range from approximately 100 to approximately 100,000 Daltons.

As used herein the term "monomer" is a compound containing at least one polymerizable group and an average molecular weight of about less than 2000 Daltons, as measured via gel permeation chromatography using refractive index detection.

The present invention provides hydroxyl-functionalized lactam polymers and copolymers derivatives (hydroxyl polymer derivatives) useful in biomedical applications such as, tissue engineering, drug delivery, implantable devices, contact lenses, and intraocular lenses. The hydroxyl-functionalized lactam polymers comprise repeating units from substituted and unsubstituted lactams in the backbone whereby a percentage of the lactam groups are converted to hydroxy alkyl amines which are randomly distributed throughout the polymer backbone. The amines may be secondary or tertiary.

Suitable lactam groups include substituted and unsubstituted 4 to 7 membered lactam rings. Suitable substituents include C1-3 alkyl groups and aryl groups. Preferred lactams include substituted and unsubstituted 4 to 6 membered lactams and most preferably unsubstituted 4 to 6 membered lactams. Examples of suitable lactams include N-vinyllactams such as N-vinyl-2-pyrrolidone, N-vinyl-2-piperidone, N-vinyl-2-caprolactam, N-vinyl-3-methyl-2-pyrrolidone, N-vinyl-3-methyl-2-piperidone, N-vinyl-3-methyl-2-caprolactam, N-vinyl-4-methyl-2-pyrrolidone, N-vinyl-4-methyl-2-caprolactam, N-vinyl-5-methyl-2-pyrrolidone, N-vinyl-5-methyl-2-piperidone, N-vinyl-5,5-dimethyl-2-pyrrolidone, N-vinyl-3,3,5-trimethyl-2-pyrrolidone, N-vinyl-5-methyl-5-ethyl-2-pyrrolidone, N-vinyl-3,4,5-trimethyl-3-ethyl-2-pyrrolidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl-2- caprolactam, N-vinyl-7-ethyl-2-caprolactam, N-vinyl-3,5-dimethyl-2-caprolactam, N-vinyl4,6-dimethyl-2-caprolactam, N-vinyl-3,5,7-trimethyl-2-caprolactam, N-vinylmaleimide, vinylsuccinimide, mixtures thereof and the like. Preferred lactams include heterocyclic monomers containing 4 carbon atoms in the heterocyclic ring. A highly preferred vinyllactam is N-vinyl-2-pyrrolidone.

The lactam polymer may be a homopolymer or a copolymer. Suitable comonomers include methyl methacrylate, methacrylic acid, styrene, butadiene, acrylonitrile, 2-hydroxyethyl methacrylate, acrylic acid, methyl acrylate, methyl methacrylate, vinyl acetate, N,N-dimethylacrylamide, N-isopropylacrylamide and polyethyleneglycol monomethacrylates, combinations thereof and the like. Preferred comonomers include methacrylic acid, acrylic acid, acetonitrile and mixtures thereof. The lactam polymer may comprise at least about 10% lactam units, preferably at least about 30% lactam units and more preferably at least about 50% lactam units.

The lactam polymer is dissolved in a solvent and at least one reducing agent is added. Protic solvents, including aqueous and alcoholic solvents may be used. Suitable solvents include water, methanol, ethanol, 2-propanol, n-butanol, 1-pentanol, tert-amyl alcohol, glycerol, mixtures thereof and the like. The solvent may be used in amounts from about 50 to about 99 wt %, and preferably between about 70 and about 90% based upon all components in the reaction mixture.

The lactam polymer is dissolved in the solvent and the reducing agent is added. Suitable reducing agents include alkali and transition metal borohydrides, such as sodium borohydride ($NaBH_4$), zinc borohydride, sodium triacetoxyborohydride, bis(isopropoxytitanium) borohydride. The preferred reducing agent is sodium borohydride. Strong reducing agents such as lithium aluminum hydride and strong bases such as lithium diisopropylamide are not preferred as they may result in unwanted side reactions. In general, the amount of hydroxyl groups formed along the polymer backbone can be controlled by adjustment of the amount of reducing agent used in the reduction. The reducing agent is used in molar excess based upon the number of lactam groups in the lactam polymer being treated. Suitable amounts of reducing agent include from about 0.2 to about 1.2 moles reducing agent per mole of lactam group.

The reducing agent should be added in a controlled manner such that excessive frothing of the reaction mixture does not occur. Additions over at least about 30 minutes and preferably from about 30 minutes to about 2 hours may be used. It is a benefit of the present invention that the reaction of the lactam polymer may be conducted in solution. Accordingly, the reaction may be conducted at any temperature at which the selected solvent is in the liquid state. Suitable temperatures include those between about 20 and about 120° C., and preferably between about 40 and about 90° C. Pressure is not critical and ambient pressure may be used.

The reaction time will vary depending upon the reducing agent and temperature selected. Suitable reaction times include up to about 2 days, preferably from about 4 hours to about 24 hours.

Suitable catalysts or phase transfer agents may be used to facilitate the reaction. Catalysts include, but are not limited to, metal salts such as lithium chloride and calcium chloride, lanthanide salts such as cerium(III) chloride and lanthanum chloride, and metal oxides such as aluminum oxides and manganese dioxide. Suitable phase transfer agents include, but are not limited to, alkyl ammonium halides such as tetrabutyl ammonium bromide, benzalconium chloride, and the like.

The process of the present invention forms reactive hydroxyl moieties along the polymer backbone. The formation of hydroxyl groups is carried out by the reaction of hydride with the lactam carbonyl group. The resultant polymer is a hydroxyl-functionalized lactam polymer or copolymer derivative ("hydroxyl polymer derivative") comprising substituted and unsubstituted lactam repeating units and hydroxy alkyl substituted amine repeating units in said polymer's backbone. The hydroxyl functionality is randomly distributed throughout the polymer backbone. In a preferred embodiment, the amounts of hydroxyl groups that form along the polymer backbone range between about 1 and about 20 mol percent of the lactam groups in the lactam polymer. For example, a hydroxyl polymer derivative with a number average molecular weight of 100,000, and which contains 5 mol percent hydroxyl groups will have, on average, approximately 45 hydroxyl groups per 900 monomeric repeat units.

In one embodiment, the hydroxyl polymer derivatives may be used directly as additives for medical devices, such as ophthalmic devices and specifically contact lenses. In this embodiment the hydroxyl polymer derivatives have a weight average molecular weight of at least about 100,000 Daltons. The preferred weight average molecular weight of these hydroxyl polymer derivatives is greater than about 150,000; more preferably between about 150,000 to about 2,000,000 Daltons, more preferably still between about 300,000 to about 1,800,000 Daltons, most preferably about 300,000 to about 1,500,000 Daltons.

Alternatively, the molecular weight of the hydroxyl polymer derivatives of the invention can be also expressed by the K-value, based on kinematic viscosity measurements, as described in Encyclopedia of Polymer Science and Engineering, N-Vinyl Amide Polymers, Second edition, Vol 17, pgs. 198-257, John Wiley & Sons Inc. When expressed in this manner, hydroxyl polymer derivatives having K-values of greater than about 46 and preferably between about 46 and about 150.

In another embodiment, the hydroxyl polymer derivatives can be reacted, for example, with hydroxyl-reactive biologically active agents to form polymeric prodrugs which can be used as implantable devices. The biologically active agent is released from the polymer upon hydrolytic cleavage of the hydroxyl polymer derivative-agent linkage site. The biologically active agent also may be covalently linked to the hydroxyl polymer derivative via a spacer group. The biologically active agent is released upon hydrolysis of bonds linking the spacer group to the agent or the hydroxyl polymer derivative to agent, or both. When the biologically active agent is covalently according to the present invention, it can then be released in a controlled manner by hydrolysis under physiological conditions. The prodrug can exhibit one or more improved characteristics relative to the unconjugated biologically active moiety. For example, the use of hydroxyl polymer derivative can protect the biologically active moiety from degradation in various environments (such as the gastrointestinal tract (GI tract)), such that less of the biologically active agent is degraded in the prodrug form than would be degraded in the absence of the hydroxyl polymer derivative. Linking the biologically active agent to the hydroxyl polymer derivative may improve the efficiency of delivery of orally administered biologically active agents into the bloodstream relative to the delivery of orally administered biologically active agent. Furthermore, administration of the prodrug can provide greater bioavailability of the biologically active agent relative to administration of unconjugated biologically active agent. Other examples of improved characteristics of the prodrug relative to unconjugated biologically active agent include improved hydrophilicity, hydrophobicity, or amphiphilicity; improved solubility of the prodrug in aqueous environments or organic solvents; improved ability of the prodrug to cross cell membranes; improved ability of the prodrug to traverse the blood-brain barrier; improved ability of the prodrug to target a certain receptor, cell, tissue, or organ; and improved pharmacokinetic profile of the prodrug. In addition, the prodrug further can have a different level of biological activity relative to the unconjugated drug. In some embodiments, the prodrug retains some or all of the activity, but by virtue of conjugation to appropriate R groups, is less susceptible to in vivo degradation, and thus, has an increased plasma half life. In other embodiments, the prodrug has less activity than the unconjugated agent, or no activity whatsoever, and only has activity upon hydrolysis and release of the active drug. Reduced activity can be preferred, for example, when long term release of the drug is desirable.

Suitable biological active agents include any that can be linked to hydroxyl polymer derivative. Accordingly, any biologically active agents which can react with a hydroxyl group to form a covalent bond, without undergoing substantial degradation or side reactions may be used and may be selected from the following therapeutic categories: ACE-inhibitors; anti-anginal drugs; anti-arrhythmias; anti-asthmatics; anti-cholesterolemics; anti-convulsants; anti-depressants; anti-diarrhea preparations; anti-histamines; anti-hypertensive drugs; anti-infectives; anti-inflammatory agents; anti-lipid agents; anti-manics; anti-nauseants; anti-stroke agents; anti-thyroid preparations; anti-tumor drugs; anti-tussives; anti-uricemic drugs; anti-viral agents; acne drugs; alkaloids; amino acid preparations; anabolic drugs; analgesics; anesthetics; angiogenesis inhibitors; antacids; anti-arthritics; antibiotics; anticoagulants; antiemetics; antiobesity drugs; antiparasitics; antipsychotics; antipyretics; antispasmodics; antithrombotic drugs; anxiolytic agents; appetite stimulants; appetite suppressants; beta blocking agents; bronchodilators; cardiovascular agents; cerebral dilators; chelating agents; cholecystokinin antagonists; chemotherapeutic agents; cognition activators; contraceptives; coronary dilators; cough suppressants; decongestants; deodorants; dermatological agents; diabetes agents; diuretics; emollients; enzymes; erythropoietic drugs; expectorants; fertility agents; fungicides; gastrointestinal agents; growth regulators; hormone replacement agents; hyperglycemic agents; hypnotics; hypoglycemic agents; laxatives; migraine treatments; mineral supplements; mucolytics; narcotics; neuroleptics; neuromuscular drugs; NSAIDS; nutritional additives; peripheral vasodilators; prostaglandins; psychotropics; renin inhibitors; respiratory stimulants; steroids; stimulants; sympatholytics; thyroid preparations; tranquilizers; uterine relaxants; vaginal preparations; vasoconstrictors; vasodilators; vertigo agents; vitamins; and wound healing agents. In particular embodiments, the biologically active agent is a carboxylic acid derivative, such as Tranilast, described in U.S. Pat. Nos. 20030088307, 6,239,177, and 5,385,935.

Suitable reaction conditions include the use of solvents which are co-miscible with polymer and biologically active agent and include water, N,N-dimethylacetamide (DMAC), N,N-dimethylformamide (DMF), 1,4-dioxane, methyl sulfoxide (DMSO), N-methyl pyrrolidone (NMP), combinations thereof and the like. An appropriate temperature is maintained which facilitates the reaction rate while preserving the biological activity of the drug. Electrophilic addition or nucleophilic substitution reactions between lactam-OH hydroxyl groups and biologically active agent result in the formation of prodrug.

The hydroxyl polymer derivatives can also be reacted with hydroxyl reactive compounds containing at least one additional reactive moiety to form rapid curing polymers which upon exposure to water, living tissue, or other reactive compounds, results in crosslinking of the rapid curing polymer. Suitable reactive moieties include for example, carbamates, acyl chlorides, sulfonyl chlorides, isothiocyanates, cyanoacrylates, oxiranes, imines, thiocarbonates, thiols, aldehydes, aziridines, and azides. Suitable reaction conditions include the use of anhydrous solvents to prevent side reactions of the reactive moieties. For example, the hydroxyl polymer derivative may be dissolved in anhydrous 1,4-dioxane and reacted with 2 equivalents of a diisocyanate, such as 2,2,3,3,4,4,5,5-octafluorohexamethylene-1,6-diisocyanate, to form a rapid curing polymer with pendent isocyanate groups. The rapid curing polymer is then allowed to contact water, bodily tissue, or other reactive compounds to form a crosslinked network. Other suitable hydroxyl-reactive compounds bearing reactive moieties include hexamethylene diisocyanate (HMDI), 2,2,3,3,4,4-hexafluoropentamethylene-1,5-diisocyanate, tolylene-2,4-diisocyanate (TDI), isophorone diisocyanate (IPDI), p-phenylene diisocyanate, lysine diisocyanate (LDI), lysine triisocyanate (LTI), and combinations thereof and the like. Such rapid curing polymers are useful as bioadhesives or sealants for biomedical applications.

Unlike previously reported studies where formation of hydroxyl groups in plasma-polymerized N-Vinyl-2-pyrrolidone was accomplished by reduction with sodium borohydride on film surfaces the formation of hydroxyl groups in the present work occurs in solution. Thus, hydroxyl group formation occurs in the bulk, as opposed to the surface.

In other reported studies, modified poly-N-vinylpyrrolid-2-one containing two identical reactive groups in the molecule were obtained by free radical polymerization of N-vinylpyrrolid-2-one in the presence of hydrogen peroxide as the free radical initiator and subsequent treatment of the polymer with a complex hydride (such as sodium boranate and lithium boranate). The highly reactive complex hydrides were employed in amounts that were sufficiently low (0.5 to 5 weight percent) so that the lactam group of the polyvinylpyrrolidone was not attacked. In the present work, the formation of hydroxyl groups is carried out using hydride (3 to 30 weight percent or approximately 8 to 60 mol %), resulting in opening the lactam ring, thereby generating hydroxyl groups on the amine group.

The hydroxyl polymer derivatives of the present invention may be further treated with the appropriate reagents under appropriate reaction conditions to produce novel functionalized lactam polymers with desired properties.

In another embodiment, hydroxyl polymer derivatives may be reacted with a polymerizable reagent comprising at least one polymerizable group to form reactive lactam polymers. Polymerizable groups are any that can undergo anionic, cationic or free radical polymerization. Suitable free radical reactive groups include acrylates, styryls, vinyls, vinyl ethers, $C_{1-6}$alkylacrylates, acrylamides, $C_{1-6}$alkylacrylamides, N-vinyllactams, N-vinylamides, $C_{2-12}$alkenyls, $C_{2-12}$alkenylphenyls, $C_{2-12}$alkenylnaphthyls, or $C_{2-6}$alkenylphenyl$C_{1-6}$alkyls. Cationic reactive groups include vinyl ethers, epoxide groups, mixtures thereof and the like. Preferred reactive groups include methacrylates, acrylates, methacrylamides, acrylamides, and mixtures thereof. Specific examples of photo-polymerizable reagents include acryloyl chloride, methacryloyl chloride, methacrylic anhydride, methacrylic acid, acrylic acid, 3-isopropenyl-alpha,alpha-dimethylbenzyl isocyanate, or 2-isocyanatoethyl methacrylate).

Additionally, other groups which are reactive via the following crosslinking mechanisms, may also be used as reactive groups 2+2 cycloaddition, Diels-Alder reaction, ring opening metathesis polymerization (ROMP), vulcanization, epoxy curing, and the like.

In another embodiment of the present invention, either the hydroxyl polymer derivatives or the reactive lactam polymers having a covalently attached fluorescent dye (also referred to as a fluorescent probe) may be formed. The resultant polymer is referred to as "fluorescently labeled polymer" and "fluorescently labeled, reactive polymer", respectively. Fluorescent dyes such as, Texas Red, N-methylisatoic anhydride, dansyl derivatives, such as dansyl chloride, dansyl hydrazine, m-dansylaminophenylboronic acid; rhodamine derivatives, such as tetramethylrhodamine-5-carbonyl azide; fluorescein derivatives, such as fluorescein (free acid and sodium salt), fluorescein isothiocyanate (FITC), 5-(4,6-dichlorotriazinyl) aminofluorescein (5-DTAF), fluorescamine, fluorescein-5-carbonyl azide diacetate; anthracene derivatives, such as 9-anthroylnitrile and 9-anthracene carbonyl chloride; carbazole derivatives, such as 9-carbazoleacetic acid, carbazole-9-carbonyl chloride, 9-carbazolepropionic acid; and coumarin derivatives, such as 7-diethylaminocoumarin-3-carbonyl azide and 7-methoxycoumarin-3-carbonyl azide are capable of forming a chemical bond with the appropriate functional group of hydroxyl polymer derivative (such as, the hydroxyl moiety) or reactive lactam polymer. The stability of the chemical bond between the dye and the hydroxyl polymer derivative or reactive lactam polymer is particularly important because the conjugate is typically stored and used repeatedly over a relatively long period of time. In addition, this conjugate may be subjected to rigorous washing steps during polymer purification or contact lens extraction. The fluorescently labeled polymer or fluorescently labeled reactive polymer can be incorporated into medical devices, such as ophthalmic devices, and for example, contact lenses so the release profile of the hydroxyl polymer derivative or reactive lactam polymer can be monitored using fluorescence or UV-Vis spectroscopy. Suitable conditions for reacting the fluorescent dye with the hydroxyl polymer derivative include dissolving the polymer and dye in an appropriate solvent and stirring until reaction is complete as determined by spectroscopic or chromatographic methods known to those skilled in the art.

The reactive lactam polymers of the invention contains one or more different crosslinkable group(s) and, if desired, further modifier(s), such as fluorescent probes, in a total amount of from about 0.001 to 50 weight percent, preferably from 0.001 to 40 weight percent, more preferably from 0.001 to 25 weight percent, more preferably still from 0.001 to 15 weight percent, based on the number of hydroxyl functional groups in the starting hydroxyl polymer derivative.

For applications where low modulus is desirable, such as ophthalmic devices and particularly soft contact lenses, reactive lactam polymers suitable for the production of ophthalmic devices comprise, in particular, from about 0.001 to about 25 weight percent, preferably from about 0.5 to 15 weight percent, more preferably from about 0.5 to 12 weight percent, of these crosslinkable units based on the number of hydroxyl functional groups in the starting hydroxyl polymer derivative.

The present invention also provides a method for making lactam-based hydrogels using reactive lactam polymers. The method comprises dissolving reactive lactam polymer in an appropriate solvent (for example, water, chloroform, methylene chloride, 1,4-dioxane, N,N-dimethylformamide, N,N-dimethylacetamide, methyl sulfoxide, or alcohols). To this solution is added at least one thermal polymerization initiator such as lauryl peroxide, benzoyl peroxide, isopropyl percarbonate, azobisisobutyronitrile, and the like, that generate free radicals at moderately elevated temperatures, or a photoinitiator such as aromatic alpha-hydroxy ketones, alkoxyoxybenzoins, acetophenones, acyl phosphine oxides, and a tertiary amine plus a diketone, mixtures thereof and the like. When the polymer solution is exposed to visible or ultraviolet light under appropriate reaction conditions, a hydrogel is formed. Prior to irradiation, the polymer solution can also contain components (for example, cells, bioactive factors, growth factors, cell adhesion molecules, or drugs) that would be useful for biomedical applications (for example, tissue engineering, drug delivery, implantable devices, contact lenses, and intraocular lenses).

The hydrogel can serve as a temporary structure which eventually breaks down and dissolves as the crosslinking groups hydrolyze. To those skilled in the art it is understood that certain reactive groups, such as, for example acrylates, would be more hydrolytically labile than methacrylates when linked to hydroxyl polymer derivatives. Thus, a lactam hydrogel prepared with acrylate groups will break down and dissolve faster than a lactam hydrogel prepared with methacrylate groups.

The hydroxyl polymer derivative or reactive lactam polymer may also be polymerized with other reactive components to form biomedical devices. For example, hydroxyl polymer derivatives, reactive lactam polymers and mixtures thereof may be polymerized with reactive comonomers to form hydrogels useful for ophthalmic devices such as contact lenses. When reactive comonomers are polymerized with hydroxyl polymer derivatives, the hydroxyl polymer derivatives are incorporated into the hydrogel formulation without significant covalent bonding to the hydrogel. The absence of significant covalent bonding means that while a minor degree of covalent bonding may be present, it is incidental to the retention of the hydroxyl polymer derivative in the hydrogel matrix. Whatever incidental covalent bonding may be present, it would not by itself be sufficient to retain the hydroxyl polymer derivative in the hydrogel matrix. Instead, the vastly predominating effect keeping the hydroxyl polymer derivative associated with the hydrogel is entrapment. The hydroxyl polymer derivative is "entrapped", according to this specification, when it is physically retained within a hydrogel matrix. This is done via entanglement of the polymer chain of the hydroxyl polymer derivative within the hydrogel polymer matrix. However, van der Waals forces, dipole-dipole interactions, electrostatic attraction and hydrogen bonding can also contribute to this entrapment to a lesser extent.

Suitable comonomers may comprise one or more silicone-containing components and, optionally one or more hydrophilic components. The silicone-containing and hydrophilic components used to make the polymer of this invention can be any of the known components used in the prior art to make silicone hydrogels. These terms silicone-containing component and hydrophilic component are not mutually exclusive, in that, the silicone-containing component can be somewhat hydrophilic and the hydrophilic component can comprise some silicone, because the silicone-containing component can have hydrophilic groups and the hydrophilic components can have silicone groups.

Further, silicone-containing component(s) and hydrophilic component(s) can be reacted prior to polymerization to form a prepolymer which is later polymerized in the presence of a diluent to form the polymer of this invention. When prepolymers or macromers are used, it is preferred to polymerize at least one silicone-containing monomer and at least one hydrophilic monomer in the presence of the diluent, wherein the silicone-containing monomers and the hydrophilic monomers differ. Thus, it is understood that the terms "silicone-containing components" and "hydrophilic components" include monomers, macromonomers and prepolymers.

A silicone-containing component is one that contains at least one [—Si—O—Si] group, in a monomer, macromer or prepolymer. Preferably, the Si and attached O are present in the silicone-containing component in an amount greater than 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, N-vinyl lactam, N-vinylamide, and styryl functional groups. Examples of silicone-containing components which are useful in this invention may be found in U.S. Pat. Nos. 3,808,178; 4,120,570; 4,136,250; 4,153,641; 4,740,533; 5,034,461 and 5,070,215, and EP080539. All of the patents cited herein are hereby incorporated in their entireties by reference. These references disclose many examples of olefinic silicone-containing components.

Further examples of suitable silicone-containing monomers are polysiloxanylalkyl(meth)acrylic monomers represented by the following formula:

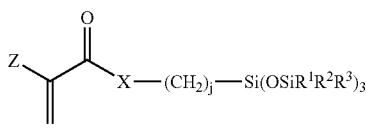

Formula I wherein: Z denotes H or lower alkyl and preferably H or methyl; X denotes O or $NR^4$; each $R^4$ independently denotes hydrogen or methyl, each $R^1$-$R^3$ independently denotes a lower alkyl radical or a phenyl radical, and j is 1 or 3 to 10.

Examples of these polysiloxanylalkyl(meth)acrylic monomers include methacryloxypropyl tris(trimethylsiloxy)silane, methacryloxypropyl pentamethyldisiloxane, and methyldi(trimethylsiloxy)methacryloxymethyl silane. Methacryloxypropyl tris(trimethylsiloxy)silane is the most preferred.

One preferred class of silicone-containing components is a poly(organosiloxane)prepolymer represented by Formula II:

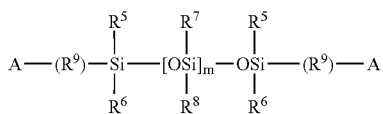

Formula II wherein each A independently denotes an activated unsaturated group, such as an ester or amide of an acrylic or a methacrylic acid or an alkyl or aryl group (providing that at least one A comprises an activated unsaturated group capable of undergoing radical polymerization); each of $R^5$, $R^6$, $R^7$ and $R^8$ are independently selected from the group consisting of a monovalent hydrocarbon radical or a halogen substituted monovalent hydrocarbon radical having 1 to 18 carbon atoms which may have ether linkages between carbon atoms;

$R^9$ denotes a divalent hydrocarbon radical having from 1 to 22 carbon atoms, and m is 0 or an integer greater than or equal to 1, and preferable 5 to 400, and more preferably 10 to 300. One specific example is α, ω-bismethacryloxypropyl poly-dimethylsiloxane. Another preferred example is mPDMS (monomethacryloxypropyl terminated mono-n-butyl terminated polydimethylsiloxane).

Another useful class of silicone containing components includes silicone-containing vinyl carbonate or vinyl carbamate monomers of the following formula:

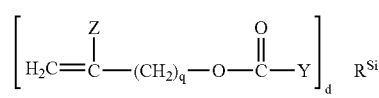

Formula III wherein: Y denotes O, S or NH; $R^{Si}$ denotes a silicone-containing organic radical; R denotes hydrogen or lower alkyl, and preferably H or methyl; d is 1, 2, 3 or 4; and q is 0 or 1. Suitable silicone-containing organic radicals $R^{Si}$ include the following:

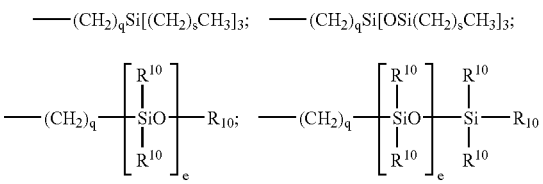

wherein:
$R^{10}$ denotes

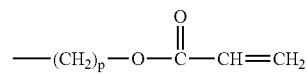

Wherein p is 1 to 6; or an alkyl radical or a fluoroalkyl radical having 1 to 6 carbon atoms; e is 1 to 200; q is 1, 2, 3 or 4; and s is 0, 1, 2, 3, 4 or 5.

The silicone-containing vinyl carbonate or vinyl carbamate monomers specifically include: 1,3-bis[4-(vinyloxycarbonyloxy)but-1-yl]tetramethyl-isiloxane 3-(vinyloxycarbonylthio)propyl-[tris(trimethylsiloxysilane]; 3-[tris(trimethylsiloxy)silyl]propyl allyl carbamate; 3-[tris(trimethylsiloxy)wily1]propyl vinyl carbamate; trimethylsilylethyl vinyl carbonate; trimethylsilylmethyl vinyl carbonate, and

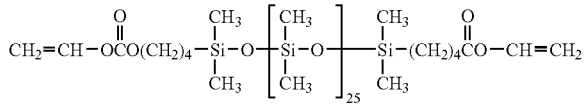

Another class of silicone-containing components includes compounds of the following formulae:

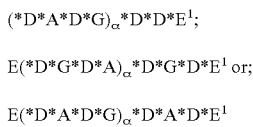

Formulae IV-V wherein:

D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

$\alpha$ is at least 1;

A denotes a divalent polymeric radical of formula:

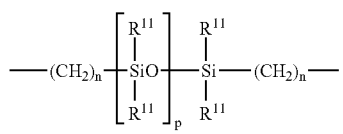

Formula VI $R^{11}$ independently denotes an alkyl or fluoro-substituted alkyl group having 1 to 10 carbon atoms which may contain ether linkages between carbon atoms; r is at least 1; and p provides a moiety weight of 400 to 10,000; each of E and $E^1$ independently denotes a polymerizable unsaturated organic radical represented by formula:

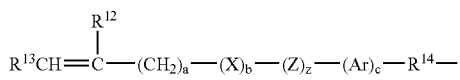

Formula VII wherein: $R^{12}$ is hydrogen or methyl; $R^{13}$ is hydrogen, an alkyl radical having 1 to 6 carbon atoms, or a —CO—Y—$R^{15}$ radical wherein Y is —O—,Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; a is 0 to 6; b is 0 or 1; e is 0 or 1; and c is 0 or 1.

A preferred silicone-containing component is represented by the following formula:

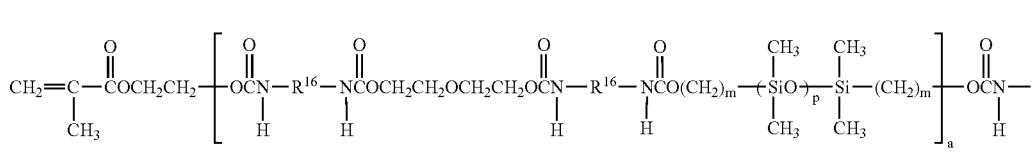

Formula VIII

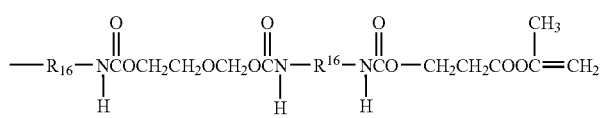

wherein $R^{16}$ is a diradical of a diisocyanate after removal of the isocyanate group, such as the diradical of isophorone diisocyanate. Another preferred silicone containing macromer is compound of formula IX (in which x+y is a number in the range of 10 to 30) formed by the reaction of fluoroether, hydroxy-terminated polydimethylsiloxane, isophorone diisocyanate and isocyanatoethylmethacrylate.

Formula IX

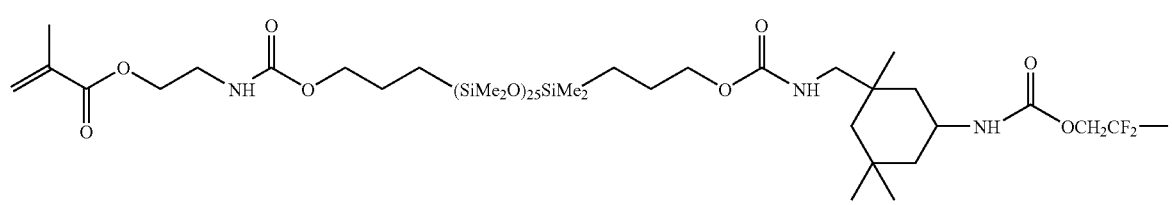

-continued

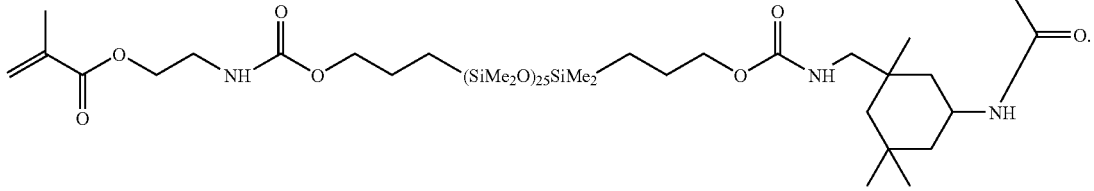

Other silicone-containing components suitable for use in this invention include those described is WO 96/31792 such as macromers containing polysiloxane, polyalkylene ether, diisocyanate, polyfluorinated hydrocarbon, polyfluorinated ether and polysaccharide groups. U.S. Pat. Nos. 5,321,108; 5,387,662 and 5,539,016 describe polysiloxanes with a polar fluorinated graft or side group having a hydrogen atom attached to a terminal difluoro-substituted carbon atom. Such polysiloxanes can also be used as the silicone monomer in this invention.

The hydrogels may further comprise hydrophilic components, such as those which are capable of providing at least about 20% and preferably at least about 25% water content to the resulting lens when combined with the remaining reactive components. When present, suitable hydrophilic components may be present in amounts up to about 60 weight %, preferably between about 10 to about 60 weight %, more preferably between about 15 to about 50 weight % and more preferably still between about 20 to about 40 weight %, all based upon the weight of all reactive components. The hydrophilic monomers that may be used to make the polymers of this invention have at least one polymerizable double bond and at least one hydrophilic functional group. Examples of functional groups with polymerizable double bonds include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds. Such hydrophilic monomers may themselves be used as crosslinking agents. "Acrylic-type" or "acrylic-containing" monomers are those monomers containing the acrylic group (CRH=CRCOX)

wherein R is H or CH$_3$, R is H, alkyl or carbonyl, and X is O or N, which are also known to polymerize readily, such as N,N-dimethylacrylamide (DMA), 2-hydroxyethyl acrylate, glycerol methacrylate, 2-hydroxyethyl methacrylamide, polyethyleneglycol monomethacrylate, methacrylic acid, acrylic acid and mixtures thereof.

Hydrophilic vinyl-containing monomers are those which may be copolymerized with the reactive OH-lactam polymers and thus incorporated into the hydrogels of the present invention include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, N-vinyl formamide, N-2-hydroxyethyl vinyl carbamate, N-carboxy-β-alanine N-vinyl ester, with NVP being preferred.

Other hydrophilic monomers that can be employed in the invention include polyoxyethylene polyols having one or more of the terminal hydroxyl groups replaced with a functional group containing a polymerizable double bond. Examples include polyethylene glycol with one or more of the terminal hydroxyl groups replaced with a functional group containing a polymerizable double bond. Examples include polyethylene glycol reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art.

More preferred hydrophilic monomers which may be incorporated into the polymer of the present invention include hydrophilic monomers such as N,N-dimethylacrylamide (DMA), 2-hydroxyethyl acrylate, 2-hydroxyethyl methacrylate, glycerol methacrylate, 2-hydroxyethyl methacrylamide, N-vinylpyrrolidone (NVP), and polyethyleneglycol monomethacrylate.

Most preferred hydrophilic monomers include DMA, NVP and mixtures thereof.

When the reactive lactam polymers and/or hydroxyl polymer derivatives of the present invention are incorporated into a silicone hydrogel formulation, it may be desirable to include at least one a hydroxyl containing component to help compatibilize the reactive lactam polymer and/or hydroxyl polymer derivative and the silicone containing components. The hydroxyl containing component that may be used to make the polymers of this invention have at least one free radical reactive group as defined above and at least one hydrophilic functional group. The hydroxyl containing component may also act as a crosslinking agent. This hydroxyl group may be a primary, secondary or tertiary alcohol group, and may be located on an alkyl or aryl group. Examples of hydroxyl containing monomers that may be used include but are not limited to 2-hydroxyethyl methacrylate, 2-hydroxyethyl acrylate, 2-hydroxyethyl methacrylamide, 2-hydroxyethyl acrylamide, N-2-hydroxyethyl vinyl carbamate, 2-hydroxyethyl vinyl carbonate, 2-hydroxypropyl methacrylate, hydroxyhexyl methacrylate, hydroxyoctyl methacrylate and other hydroxyl functional monomers as disclosed in U.S. Pat. Nos. 5,006,622; 5,070,215; 5,256,751 and 5,311,223. Preferred hydroxyl containing monomers include 2-hydroxyethyl methacrylate, and hydroxyl functional monomers including silicone or siloxane functionalities, such as the hydroxyl-functionalized silicone containing monomers disclosed in WO03/022321, and the compatibilizing components comprising at least one active hydrogen and at least one siloxane group as disclosed in WO03/022322, the disclosure of which is incorporated herein by reference. Specific examples of include 2-propenoic acid, 2-methyl-2-hydroxy-3-[3-[1,3,3,3-tetramethyl-1-[trimethylsilyl)oxy]disiloxanyl]

propoxy]propyl ester (which can also be named (3-methacryloxy-2-hydroxypropyloxy)propylbis(trimethylsiloxy) methylsilane), 3-methacryloxy-2-hydroxypropyloxy)propyltris(trimethylsiloxy)silane, bis-3-methacryloxy-2-hydroxypropyloxypropyl polydimethylsiloxane, 3-methacryloxy-2-(2-hydroxyethoxy)propyloxy)propylbis(trimethylsiloxy)methylsilane, N-2-methacryloxyethyl-O-(methyl-bis-trimethylsiloxy-3-propyl)silyl carbamate and N,N,N',N'-tetrakis(3-methacryloxy-2-hydroxypropyl)-α,ω)-bis-3-aminopropyl-polydimethylsiloxane and mixtures thereof. Preferred compatibilizing components include 2-hydroxyethyl methacrylate, 3-methacryloxy-2-hydroxypropyloxy)propylbis(trimethylsiloxy)methylsilane), 3-methacryloxy-2-hydroxypropyloxy)propyltris(trimethylsiloxy)silane and mixtures thereof.

When a compatibilizing component is used, effective amounts of compatibilizing component in the polymer formulation include about 5 percent (weight percent, based on the total weight of the reactive components) to about 90 percent, preferably about 10 percent to about 80 percent, most preferably, about 20 percent to about 50 percent.

Alternatively the reactive lactam polymers and/or hydroxyl polymer derivative polymers may be included in hydrophilic hydrogels. Generally these hydrogels are made from the hydrophilic monomers listed above. Commercially available hydrogel formulations include, but are not limited to etafilcon, polymacon, vifilcon, genfilcon A and lenefilcon A.

Generally the reactive components are mixed in a diluent to form a reaction mixture. Suitable diluents are known in the art.

Classes of suitable diluents for silicone hydrogel reaction mixtures include ethers, esters, alkanes, alkyl halides, silanes, amides, alcohols and combinations thereof. Amides and alcohols are preferred diluents with alcohols having 2 to 20 carbons, amides having 10 to 20 carbon atoms derived from primary amines and carboxylic acids having 8 to 20 carbon atoms. In some embodiments primary and tertiary alcohols are preferred. Preferred classes include alcohols having 5 to 20 carbons and carboxylic acids having 10 to 20 carbon atoms.

Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, SiGMA acetate, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino)ethanol mixtures thereof and the like.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, tert-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like.

Suitable diluents for non-silicone containing reaction mixtures include glycerin, ethylene glycol, ethanol, methanol, ethyl acetate, methylene chloride, polyethylene glycol, polypropylene glycol, low molecular weight PVP, such as disclosed in U.S. Pat. Nos. 4,018,853, 4,680,336 and 5,039,459, including, but not limited to boric acid esters of dihydric alcohols, combinations thereof and the like.

Mixtures of diluents may be used. The diluents may be used in amounts up to about 50% by weight of the total of all components in the reaction mixture. More preferably the diluent is used in amounts less than about 45% and more preferably in amounts between about 15 and about 40% by weight of the total of all components in the reaction mixture.

In another embodiment, the diluent comprises a low molecular weight hydrophilic polymer without reactive groups. The diluent may also comprise additional components such as release agents. Suitable release agents are water soluble and aid in lens deblocking.

It is generally necessary to add one or more cross-linking agents, also referred to as cross-linking monomers, to the reaction mixture, such as ethylene glycol dimethacrylate ("EGDMA"), trimethylolpropane trimethacrylate ("TMPTMA"), glycerol trimethacrylate, polyethylene glycol dimethacrylate (wherein the polyethylene glycol preferably has a molecular weight up to, e.g., about 5000), and other polyacrylate and polymethacrylate esters, such as the end-capped polyoxyethylene polyols described above containing two or more terminal methacrylate moieties. The cross-linking agents are used in the usual amounts, e.g., from about 0.000415 to about 0.0156 mole per 100 grams of reactive components in the reaction mixture. (The reactive components are everything in the reaction mixture except the diluent and any additional processing aids which do not become part of the structure of the polymer.) Alternatively, if the hydrophilic monomers and/or the silicone-containing monomers act as the cross-linking agent, the addition of a crosslinking agent to the reaction mixture is optional. Examples of hydrophilic monomers which can act as the crosslinking agent and when present do not require the addition of an additional crosslinking agent to the reaction mixture include polyoxyethylene polyols described above containing two or more terminal methacrylate moieties.

An example of a silicone-containing monomer which can act as a crosslinking agent and, when present, does not require the addition of a crosslinking monomer to the reaction mixture includes α, ω-bismethacryloxypropyl polydimethylsiloxane.

The reaction mixture may contain additional components such as, but not limited to, UV absorbers, medicinal agents, antimicrobial compounds, reactive tints, pigments, copolymerizable and nonpolymerizable dyes, release agents and combinations thereof.

A polymerization catalyst or initiator is preferably included in the reaction mixture. The polymerization initiators includes compounds such as lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ether and a combination of camphorquinone and ethyl 4-(N,N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitators which may be used are disclosed in Volume III, Photoinitiators for Free Radical Cationic & Anionic Photopolymerization, $2^{nd}$ Edition by J. V. Crivello & K. Dietliker; edited by G. Bradley; John Wiley and Sons; New York; 1998, which is incorporated herein by reference. The initiator is used in the reaction mixture in effective amounts to initiate photopolymerization of the reaction mixture, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, when a photoinitiator is used, the preferred initiators are bisacylphosphine oxides, such as bis(2,4,6-trimethylbenzoyl)-phenyl phosphine oxide (Irgacure 819®) or a combination of 1-hydroxycyclohexyl phenyl ketone and bis (2,6-dimethoxybenzoyl)-2,4-4-trimethylpentyl phosphine oxide (DMBAPO), and the preferred method of polymerization initiation is visible light. The most preferred is bis(2,4, 6-trimethylbenzoyl)-phenyl phosphine oxide (Irgacure 819®).

The invention further comprises, consists and consists essentially of a silicone hydrogel containing a hydroxyl polymer derivative and/or reactive lactam polymer and biomedical device, ophthalmic device and contact lenses formed from the formulations shown below: (all numbers are preceded by the word "about")

| | Wt % | | |
|---|---|---|---|
| Lactam | OPC | HM | CC |
| 1-15 | 5-75, or | 0-70, or | 0-90, or |
| | 5-60, or | 5-60, or | 10-80, or |
| | 10-50 | 10-50 | 20-50 |
| 3-15 | 5-75, or | 0-70, or | 0-90, or |
| | 5-60, or | 5-60, or | 10-80, or |
| | 10-50 | 10-50 | 20-50 |
| 5-12 | 5-75, or | 0-70, or | 0-90, or |
| | 5-60, or | 5-60, or | 10-80, or |
| | 10-50 | 10-50 | 20-50 |

Lactam is hydroxyl polymer derivative and/or reactive lactam polymer
OPC is oxygen permeable component
HM is hydrophilic monomer
CC is compatibilizing component The reaction mixtures of the present invention can be formed by any of the methods know to those skilled in the art, such as shaking or stirring, and used to form polymeric articles or devices by known methods.

For example, the biomedical devices of the invention may be prepared by mixing reactive components and the diluent(s) with a polymerization initator and curing by appropriate conditions to form a product that can be subsequently formed into the appropriate shape by lathing, cutting and the like. Alternatively, the reaction mixture may be placed in a mold and subsequently cured into the appropriate article.

Various processes are known for processing the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197, 266. The preferred method for producing contact lenses comprising the polymer of this invention is by the molding of the silicone hydrogels, which is economical, and enables precise control over the final shape of the hydrated lens. For this method, the reaction mixture is placed in a mold having the shape of the final desired silicone hydrogel, i.e., water-swollen polymer, and the reaction mixture is subjected to conditions whereby the monomers polymerize, to thereby produce a polymer/diluent mixture in the shape of the final desired product. Then, this polymer/diluent mixture is treated with a solvent to remove the diluent and ultimately replace it with water, producing a silicone hydrogel having a final size and shape which are quite similar to the size and shape of the original molded polymer/diluent article. This method can be used to form contact lenses and is further described in U.S. Pat. Nos. 4,495,313; 4,680,336; 4,889,664; and 5,039,459, incorporated herein by reference.

The biomedical devices, and particularly ophthalmic lenses of the present invention have a balance of properties which makes them particularly useful. Such properties include clarity, water content, oxygen permeability and contact angle. Thus, in one embodiment, the biomedical devices are contact lenses having a water content of greater than about 17%, preferably greater than about 20% and more preferably greater than about 25%. The biomedical devices, and particularly ophthalmic devices and contact lenses have contact angles (advancing) which are less than about 80°, preferably less than about 70° and more preferably less than about 65°.

As used herein clarity means substantially free from visible haze. Preferably clear lenses have a haze value of less than about 150%, more preferably less than about 100% compared to a −1.00 diopter CSI Thin Lens®. Haze is measured by placing a hydrated test lens in borate buffered saline in a clear 20×40×10 mm glass cell at ambient temperature above a flat black background, illuminating from below with a fiber optic lamp (Titan Tool Supply Co. fiber optic light with 0.5" diameter light guide set at a power setting of 4-5.4) at an angle 66° normal to the lens cell, and capturing an image of the lens from above, normal to the lens cell with a video camera (DVC 1300C:19130 RGB camera with Navitar TV Zoom 7000 zoom lens) placed 14 mm above the lens platform. The background scatter is subtracted from the scatter of the lens by subtracting an image of a blank cell using EPIX XCAP V 1.0 software. The subtracted scattered light image is quantitatively analyzed, by integrating over the central 10 mm of the lens, and then comparing to a −1.00 diopter CSI Thin Lens®, which is arbitrarily set at a haze value of 100, with no lens set as a haze value of 0. Five lenses are analyzed and the results are averaged to generate a haze value as a percentage of the standard CSI lens.

The reactive lactam polymers, fluorescently labeled lactam polymers and lactam prodrugs may also be used as coating materials for biomedical devices.

When used as a coating, the reactive lactam polymers, fluorescently labeled lactam polymers and lactam prodrugs may have any molecular weight. Generally, coating polymers have molecular weights between about 100 and 1,000,000, preferably between about 1,000 and 500,000 $M_v$. Molecular weights can be measured in a variety of ways including, but not limited to, molecular mass spectrometry and size exclusion methods such as gel filtration chromatography and gel permeation chromatography.

In the process of the invention, the surface to be coated is contacted with the coating polymer in any convenient manner, such as dip, spray, wipe, spin coating and the like. For example, the device may be placed in a solution of coating polymer, solvent and optionally, coupling additives.

Suitable solvents for use in the invention are non-nucleophilic solvents capable of solubilizing the coating polymer without negatively reacting with the biomedical device. Suitable solvents include, but are not limited to, DMF, DMAC, DMSO, methylene chloride, chloroform, ethyl acetate, DPMA, mixtures thereof and the like. Preferred solvents include DMF and DPMA.

The device is contacted with the solvent/coating polymer solution under conditions suitable to form the coating. Suitable temperatures include those between the freezing and boiling points of the selected solvent, preferably between about 0 and about 100° C. and more preferably between about 20 and about 50° C. The contact time used will be a length of time sufficient to coat the surface to the extent desired. Contact times may be up to about 2 days, preferably up to about 1 day, and most preferably up to about 12 hours. Pressure is not critical in the coating reaction of the present invention. However, those of skill in the art will recognize that elevated pressures and temperatures will enable the reaction to be conducted in a shorter period of time.

Coupling additives are any compound(s) that enables the amide and/or ester linkage between the device(s) and coating (s) to be formed more readily than without their addition and include, but are not limited to, trans-esterification reagents, catalysts, thereof and the like. Examples include 4-dimethylaminopyridine (DMAP), 1-(3-dimethylaminopropyl)-3-ethylcarbodiimide hydrochloride salt (EDC), 1,3-diisopropylcarbodiimide, 1,3-dicyclohexylcarbodiimide, 1-hydroxybenzotriazole (HOBt), 1-hydroxybenzotriazole hydrate, crown ethers, acids, bases, enzymes, combinations thereof and the like.

A coating effective amount of coating polymer is used, meaning an amount sufficient to coat the surface to the desired degree. Generally, the amount of coating compound or polymer used is about 0.1 to about 20 weight %, preferably about 0.5 to about 10 wieght %, and more preferably, about 0.8 to about 5 weight % of the coating solution.

Following contacting, the surface may be washed with water or buffered saline solution to remove unrelated (or unreacted) polymer, leaving group, solvent, and byproducts. Optionally, the coated surface may be heated in water to extract residual coating, leaving group, and byproducts and to ensure the break down of leaving group complexes that may have formed.

The hydroxyl polymer derivatives may also be added to the packaging, storing or cleaning solutions for ophthalmic devices. When added to these solutions the hydroxyl polymer derivatives may be added at any stage, and in amounts from about 0.005 to about 5 and preferably from 0.1 to about 1 wt %. The hydroxyl polymer derivatives may also be added to ophthalmic solutions, such as eye drops and ointments.

The molecular weight of the reactive lactam polymer in this embodiment is about 5,000 to about 500,000, number average molecular weight, measured via gel permeation chromatography using poly(2-vinyl pyridine) standards in hexafluoroisopropanol (HFIP).

The reactive lactam polymer, is advantageously stable in the uncrosslinked state, so that it can be subjected to purification. The reactive lactam polymers may be purified in a manner known in the art, for example by precipitation with organic solvents, such as diisopropyl ether, filtration and washing, extraction in a suitable solvent, dialysis or ultrafiltration. These purification operations allow the reactive lactam polymers to be obtained in pure form, for example as a solid, which is referred to hereinafter as pure or essentially pure. This term is understood to refer to reactive lactam polymers that are free or at least substantially free from undesired constituents. As used herein, substantially free from, means having less than 10% impurities.

Undesired constituents are generally those that are physiologically undesired, especially monomeric, small oligomeric or necessary starting compounds used for the preparation of the reactive lactam polymer.

The preferred process for the purification of reactive lactam polymers is precipitation. The precipitation can be carried out repeatedly, for example from two to five times in solvent and co-solvent mixtures such as diethyl ether, diisopropyl ether, tert-butyl methyl ether, hexanes, or ether/hexane combinations. Alternatively, precipitations can also be carried out continuously until the desired degree of purity has been achieved.

The dynamic contact angle or DCA, was measured at 23° C., with borate buffered saline, using a Wilhelmy balance. The wetting force between the lens surface and borate buffered saline is measured using a Wilhelmy microbalance while the sample strip cut from the center portion of the lens is being immersed into the saline at a rate of 100 microns/sec. The following equation is used $$F = 2\gamma p \cos \theta \text{ or } \theta = \cos^{-1}(F/2\gamma p)$$

where F is the wetting force, $\gamma$ is the surface tension of the probe liquid, p is the perimeter of the sample at the meniscus and $\theta$ is the contact angle. Typically, two contact angles are obtained from a dynamic wetting experiment—advancing contact angle and receding contact angle. Advancing contact angle is obtained from the portion of the wetting experiment where the sample is being immersed into the probe liquid, and these are the values reported herein. At least four lenses of each composition are measured and the average is reported.

The water content was measured as follows: lenses to be tested were allowed to sit in packing solution for 24 hours. Each of three test lens were removed from packing solution using a sponge tipped swab and placed on blotting wipes which have been dampened with packing solution Both sides of the lens were contacted with the wipe. Using tweezers, the test lens were placed in a weighing pan and weighed. The two more sets of samples were prepared and weighed as above. The pan was weighed three times and the average is the wet weight.

The dry weight was measured by placing the sample pans in a vacuum oven which has been preheated to 60° C. for 30 minutes. Vacuum was applied until at least 0.4 inches Hg is attained. The vacuum valve and pump were turned off and the lenses were dried for four hours. The purge valve was opened and the oven was allowed reach atmospheric pressure. The pans were removed and weighed. The water content was calculated as follows:

$$\text{Wet weight} = \frac{\text{combined wet weight}}{\text{of pan and lenses}} - \text{weight of weighing pan}$$

$$\text{Dry weight} = \frac{\text{combined dry weight}}{\text{of pan and lens}} - \text{weight of weighing pan}$$

$$\% \text{ water content} = \frac{(\text{wet weight} - \text{dry weight})}{\text{wet weight}} \times 100$$

The average and standard deviation of the water content are calculated for the samples are reported.

Modulus was measured by using the crosshead of a constant rate of movement type tensile testing machine equipped with a load cell that is lowered to the initial gauge height. A suitable testing machine includes an Instron model 1122. A dog-bone shaped sample having a 0.522 inch length, 0.276 inch "ear" width and 0.213 inch "neck" width was loaded into the grips and elongated at a constant rate of strain of 2 in/min. until it broke. The initial gauge length of the sample (Lo) and sample length at break (Lf) were measured. Twelve specimens of each composition were measured and the average is reported. Tensile modulus was measured at the initial linear portion of the stress/strain curve.

The examples below serve to further illustrate the invention. In the examples, unless expressly stated otherwise, amounts are by weight. Examples are not intended to represent any restriction of the invention, for example to the scope of the examples.

EXAMPLE 1

In a 4-liter beaker equipped with a mechanical stirring apparatus 100 gm (0.9 mol of monomer units) of PVP (PVP K90, 360,000 molecular weight polymer, purchased from ISP, Wayne, N.J.) was dissolved in 900 mL 2-propanol. 17 gm (0.45 mol) of sodium borohydride ($NaBH_4$) was added to the PVP solution over a 1-hour period. Substantial bubbling was observed. The reaction was stirred at room temperature for 24 hours. The polymer was precipitated in cold acetone (at approximately −20° C.) and then dried under vacuum. The polymer was redissolved in 2 liters of 2-propanol and the solution was centrifuged at 7500 RPM (22° C.) for 15 minutes to remove excess borate salts. The salts were discarded and the polymer was precipitated in cold hexane:diethyl ether (50:50) to yield a white solid having a number average molecular weight of 86,000 and weight average molecular weight of 332,000 (gel permeation chromatography, using hexafluoroisopropanol (HFIP) and poly(2-vinylpyridine) standards). FTIR spectra showed O—H and C—O bands, as shown by the bands at approximately 3400 and 1000 $cm^{-1}$, respectively. Increased band intensities were observed when increased levels of $NaBH_4$ were used in the reaction. The hydroxyl number (OH#) was determined by titration [OH#=30.0 mg KOH/g sample, hydroxyl equivalent weight (EW)=1700 g/mol].

EXAMPLE 2

In a 4-liter beaker equipped with a mechanical stirring apparatus 100 gm (0.9 mol of monomer units) of PVP (PVP K90, 360,000 molecular weight polymer, ISP, Wayne, N.J.) was dissolved in 900 mL 2-propanol. 17 gm (0.45 mol) of sodium borohydride ($NaBH_4$) was added to the PVP solution over a 1-hour period. Substantial bubbling was observed. The reaction was stirred at room temperature for 2 hours and then at 55° C. for 4 hours. The reaction mixture was poured into dialysis membrane (3500 MWCO) and dialyzed against deionized water for 10 days and methanol for 3 days. The polymer was precipitated in cold hexane:diethyl ether (50:50) to yield a white solid having a number average molecular weight of 74,000 and weight average molecular weight of 319,000 (gel permeation chromatography using hexafluoroisopropanol (HFIP) and poly(2-vinylpyridine) standards). FTIR spectra showed O—H and C—O bands, as shown by the bands at approximately 3400 and 1000 $cm^{-1}$, respectively. Increased band intensities were observed when increased levels of $NaBH_4$ were used in the reaction. The hydroxyl number (OH#) was determined by titration (OH#=31.4 mg KOH/g sample, hydroxyl EW=1700 g/mol).

EXAMPLE 3

In a 1-liter beaker equipped with a mechanical stirring apparatus 24.3 gm (0.219 mol of monomer units) of PVP (PVP K30, 40,000 molecular weight polymer, product of ISP, Wayne, N.J.) was dissolved in 250 mL 2-propanol. 2.5 gm (0.065 mol) of sodium borohydride ($NaBH_4$) was added to the PVP solution over a 1-hour period. Substantial bubbling was observed. The reaction was stirred at room temperature for 2 hours. Distilled water (100 mL) was added to the reaction mixture, which was then stirred for 4 hours at 55° C. The reaction mixture was poured into dialysis membrane (3500 MWCO) and dialyzed against deionized water for 10 days and methanol for 3 days. The polymer was precipitated in cold diisopropyl ether (50:50) to yield a white solid having a number average molecular weight of 36,000 and weight average molecular weight of 10,200 (gel permeation chromatography using hexafluoroisopropanol (HFIP) and poly(2-vinylpyridine) standards). FTIR spectra showed O—H and C—O bands, as shown by the bands at approximately 3400 and 1000 $cm^{-1}$, respectively. Increased band intensities were observed when increased levels of $NaBH_4$ were used in the reaction. The hydroxyl number (OH#) was determined by titration (OH#=19 mg KOH/g sample)).

EXAMPLE 4

In a 4-liter beaker equipped with a mechanical stirring apparatus 101 gm (0.908 mol of monomer units) of PVP (PVP K15, 10,000 molecular weight polymer, product of Aldrich, Milwaukee, Wis.) was dissolved in 1400 mL 2-propanol. 17 gm (0.45 mol) of sodium borohydride ($NaBH_4$) was added to the PVP solution over a 1-hour period. Substantial bubbling was observed. Distilled water (500 mL) was added to the reaction mixture and the mixture was stirred at room temperature for 18 hours at ambient temperature. The reaction mixture was poured into dialysis membrane (1000 MWCO) and dialyzed against distilled water for 10 days and methanol for 3 days. The polymer was precipitated in cold tert-butyl methyl ether to yield a fluffy white solid (45% yield), having a number average molecular weight of 6,000 and weight average molecular weight of 11,000 (gel permeation chromatography using hexafluoroisopropanol (HFIP) and poly(2-vinylpyridine) standards). The low yield was attributed to the loss of low molecular weight species during the extensive dialysis purification. The hydroxyl number was determined by titration (OH#=32.2 mg KOH/g sample, hydroxyl EW=1700 g/mol).

EXAMPLE 5

Polymer was made following the procedure of Example 2, except 34 gm (0.90 mol) $NaBH_4$ was added over a 2-hour period. The polymer was precipitated in cold hexane:diethyl ether (50:50) to yield a white solid having a number average molecular weight of 85,000 and weight average molecular weight of 333,000 (gel permeation chromatography using hexafluoroisopropanol (HFIP) and poly(2-vinylpyridine) standards).

EXAMPLE 6

In a 3-liter 3-neck round bottom flask equipped with a nitrogen inlet, rubber septum, and magnetic stir bar, 150 gm (1.35 mol of monomer units, 84 mmol of OH) of PVP—OH made in from Example 2 was dissolved in 2 liters of anhydrous 1,4-dioxane. Distilled triethylamine (41 mL, 0.30 mol) and approximately 100 milligram hydroquinone was added to the polymer solution. 13.4 gm (0.148 mol) of acryloyl chloride was added to the polymer solution dropwise and the reaction flask was covered with aluminum foil. The aluminum foil covering was used to minimize unwanted side reactions. The reaction mixture was stirred at 60° C. for 4 hours. Then triethylamine-HCl salts were removed by filtration. Half of the solvent was removed from the reaction mixture via rotary evaporation and the polymer precipitated from diisopropyl ether. The polymer was isolated as an off-white polymer.

EXAMPLE 7

In a 1-liter 3-neck round bottom flask equipped with a nitrogen inlet, rubber septum, and magnetic stir bar 13.6 gm (122 mmol of monomer units, 8 mmol of OH) of PVP—OH from Example 2 was dissolved in 700 mL of anhydrous 1,4-dioxane. 2-isocyanatoethyl methacrylate (0.95 gm, 6.1 mmol) and approximately 10 milligram of hydroquinone were added to the polymer solution. Stannous octoate solution (50 microliter, of 0.33 M in toluene) was added and the reaction flask was covered with aluminum foil. The aluminum foil covering was used to minimize unwanted side reactions. The reaction mixture was then stirred at 70° C. for 5 hours. The polymer was precipitated three times from diisopropyl ether to yield a white polymer.

EXAMPLE 8

In a 1-liter 3-neck round bottom flask equipped with a nitrogen inlet, rubber septum, and magnetic stir bar, 13.6 gm (122 mmol of monomer units, 8 mmol of OH) of PVP—OH from Example 2 was dissolved in anhydrous 1,4-dioxane (700 mL). 3-isopropenyl-alpha,alpha-dimethylbenzyl isocyanate (1.2 gm, 6.1 mmol) and approximately 10 milligrams hydroquinone was added to the polymer solution. Stannous octoate solution (50 microliter, 0.33 M in toluene) was added and the reaction flask was covered with aluminum foil. The aluminum foil covering was used to minimize unwanted side reactions. The reaction mixture was then stirred at 70° C. for 5 hours. The polymer was precipitated three times from diisopropyl ether to yield an off-white polymer.

EXAMPLE 9

In a 1-liter 3-neck round bottom flask equipped with a nitrogen inlet, rubber septum, and magnetic stir bar, 13.6 gm (122 mmol of monomer units, 8 mmol of OH) of PVP—OH from Example 2 was dissolved in 700 mL anhydrous 1,4-dioxane. Dansyl chloride (1.6 gm, 6.1 mmol) was added to the polymer solution. Triethylamine (1.2 gm, 12.2 mmol) and 4-(dimethylamino)pyridine (120 milligram, 1.0 mmol) were added and the reaction mixture was then stirred at 40° C. for 16 hours. The polymer solution was filtered and the polymer precipitated three times from diisopropyl ether to yield an off-white polymer containing approximately 0.8 mol percent fluorescent groups as confirmed by $^1$H NMR spectroscopy. $^1$H NMR spectrum (aromatic region) delta (CDCl$_3$)=8.65, 8.29, 8.18, 7.39, and 7.07. $^1$H NMR spectrum of dansyl chloride (aromatic region) delta (CDCl$_3$)=8.71, 8.44, 8.36, 7.70, 7.58, and 7.27 ppm.

EXAMPLE 10

In a 500 mL 2-neck round bottom flask equipped with a nitrogen inlet, rubber septum, and magnetic stir bar, 2.0 gm (18 mmol of monomer units, 1.1 mmol of OH) of PVP—OH from Example 2 was dissolved in 200 mL anhydrous 1,4-dioxane. Carbazole-9-carbonyl chloride (0.2 gm, 0.9 mmol) was added to the polymer solution. Triethylamine (0.2 gm, 2 mmol) and 4-(dimethylamino)pyridine (20 milligram, 0.2 mmol) were added and the reaction mixture was then stirred at 60° C. for 6 hours. The polymer solution was filtered and the polymer precipitated three times from diisopropyl ether to yield an off-white polymer containing approximately 0.3 mol perecent fluorescent groups as confirmed by 1H NMR spectroscopy.

EXAMPLE 11

In a 500 mL 2-neck round bottom flask equipped with a nitrogen inlet, rubber septum, and magnetic stir bar, 3.0 gm (27 mmol of monomer units, 1.7 mmol of OH) of PVP—OH from Example 2 was dissolved in 300 mL of anhydrous 1,4-dioxane. Carbazole-9-carbonyl chloride (0.2 gm, 0.9 mmol) and methacryloyl chloride (0.2 gm, 2 mmol) were added to the polymer solution. Triethylamine (0.2 gm, 2 mmol), 4-(dimethylamino)pyridine (20 milligram, 0.2 mmol), and 10 milligrams of hydroquinone were added and the reaction mixture was then stirred at 60° C. for 6 hours. The polymer solution was filtered and the polymer precipitated three times from diisopropyl ether to yield an off-white polymer containing appproximately 0.4 mol percent fluorescent groups and 2 mol percent photo-polymerizable groups as confirmed by $^1$H NMR spectroscopy.

EXAMPLE 12

In a 1-liter 2-neck round bottom flask equipped with a nitrogen inlet, rubber septum, and magnetic stir bar 10 gm (90 mmol of monomer units, 5.6 mmol of OH) of PVP—OH from Example 2 was dissolved in 500 mL anhydrous N,N-dimethylacetamide. Triethylamine (0.6 mL, 4.5 mmol) and 4-(dimethylamino)pyridine (55 milligram, 0.45 mmol) were added to the polymer solution. N-Methylisatoic anhydride (0.8 gm, 4.5 mmol) was dissolved in 20 mL of N,N-dimethylacetamide and the resultant solution was added to the polymer solution. The reaction mixture was stirred for 3.5 hours at 65° C. and the polymer was precipitated in hexane/diisopropyl ether three times to yield an off-white product containing approximately 0.2 mol percent fluorescent groups as confirmed by $^1$H NMR spectroscopy.

EXAMPLE 13

In a 500 mL 2-neck round bottom flask equipped with a nitrogen inlet, rubber septum, and magnetic stir bar, 6.1 gm (55 mmol of monomer units, 3.4 mmol of OH) of PVP—OH from Example 2 was dissolved in 350 mL anhydrous N,N-dimethylacetamide. 9-anthracenecarbonyl chloride (1 gm, 4 mmol) was added to the polymer solution. Triethylamine (0.6 mL, 4.6 mmol) and 4-(dimethylamino)pyridine (50 milligram, 0.4 mmol) were added and the reaction mixture was then stirred at 65° C. for 4 hours. The polymer solution was filtered and the polymer precipitated three times from 50/50 hexane/diisopropyl ether to yield an off-white polymer containing approximately 3.6 mol percent fluorescent groups as confirmed by $^1$H NMR spectroscopy.

EXAMPLE 14

In a 500 mL 2-neck round bottom flask equipped with a nitrogen inlet, rubber septum, and magnetic stir bar, 6.0 gm (54 mmol of monomer units, 3.4 mmol of OH) of PVP—OH from Example 2 was dissolved in 300 mL of anhydrous 1,4-dioxane. 1-Naphthyl isocyanate (0.91 gm, 5.4 mmol) was added to the polymer solution. Stannous octoate solution (50 microliter, 0.33 M in toluene) was added and the reaction mixture was then stirred at 70° C. for 5 hours. The polymer was then precipitated in hexane/diisopropyl ether three times to yield an off-white product containing approximately 3 mol percent fluorescent groups as confirmed by $^1$H NMR spectroscopy.

EXAMPLE 15

In a 20 mL amber vial, 21 parts by weight of methyldi (trimethylsiloxy)sylylpropylglycerol methacrylate (SI-MAA), 16 parts monomethacryloxypropyl terminated poly-dimethylsiloxane (MW 800-1000) (mPDMS), 22 parts N,N-dimethylacrylamide (DMA), 6 parts 2-hydroxyethyl methacrylate (HEMA), 0.5 parts ethyleneglycol dimethacrylate (EGDMA), 1.1 parts 2-(2'-hydroxy-5-methacrylyloxyethylphenyl)-2H-benzotriazole (Norblock 7966), 0.2 parts Bis(2,6-dimethoxybenzoyl)-2,4,4-trimethylpentylphosphine oxide (CGI 819), 21 parts tert-amyl alcohol (TAA), 7.8 parts PVP polyvinylpyrrolidone (2,500 molecular weight), and 4.3 parts PVP-methacrylate (from Example 6) were combined to make a reaction mixture. The diluent PVP (2,500 molecular weight) made up 7.8 percent of the mass of the complete reaction mixture. The resulting reaction mixture was a clear, homogeneous solution. Polypropylene contact lens molds were filled, closed and irradiated with a total of 4 mW/cm$^2$ visible light over a 10-minute period at 55° C. The molds were opened and the lenses were released into isopropanol (IPA) and then transferred into deionized water. In a similar manner, lenses were made using PVP (PVP K90, 360,000 molecular weight polymer), instead of PVP-methacrylate, and used as a control.

The lenses were clear.

EXAMPLE 16

In a 4-liter beaker equipped with a mechanical stirring apparatus 302 gm (2.72 mol) of PVP (PVP K30, 40,000 molecular weight polymer, purchased from Fluka) was dissolved in 2 L 2-propanol. 127 gm (3.35 mol) of sodium borohydride (NaBH$_4$, VenPure AF granules, 98+%, purchased from Aldrich, Milwaukee, Wis.) was added to the PVP solution over a 1-hour period. Substantial bubbling was observed. Tetrabutylammonium bromide (10.5 gm (32.6 mmol)) was added to the reaction mixture. The reaction was stirred at 60° C. for 6 hours and at room temperature for an additional 24 hours. The polymer was dialyzed against distilled water for 5 days then 2-propanol for 2 days using 1000 molecular weight cut-off dialysis membrane. The polymer was precipitated in hexanes:isopropyl ether (50:50) to yield a white solid having a number average molecular weight of 12,000 and weight average molecular weight of 34,000 (gel permeation chromatography, using hexafluoroisopropanol (HFIP) and poly(2-vinylpyridine) standards). The hydroxyl number (OH#) was determined by titration [OH#=29.1 mg KOH/g sample, hydroxyl equivalent weight (EW)=1900 g/mol].

EXAMPLE 17

In a 4-liter beaker equipped with a mechanical stirring apparatus 181 gm (1.63 mol) of PVP (PVP K30, 40,000 molecular weight polymer, purchased from Fluka) and 200 gm (1.8 mol) of PVP (PVP K25, 30,000 molecular weight polymer, purchased from Fluka) were dissolved in 2.5 L 2-propanol. Sodium borohydride (75 gm (2.0 mol)) (NaBH$_4$, VenPure AF granules, 98+%, purchased from Aldrich, Milwaukee, Wis.) was added to the PVP solution over a 1-hour period. Substantial bubbling was observed. Basic alumina (85 g) (Al$_2$O$_3$, purchased from Fluka) was added to the reaction mixture and the reaction mixture was stirred for 16 hours at room temperature. Additional NaBH$_4$ (63 gm) was added to the reaction mixture over a 1 hour period. The reaction mixture was heated to 50° C. and 1.5 L distilled water was added dropwise. The reaction mixture was stirred at 50° C. for an additional 4 hours. The Al$_2$O$_3$ was removed by filtration and the polymer solution dialyzed against distilled water for 5 days then 2-propanol for 2 days using 1000 molecular weight cut-off dialysis membrane (SpectraPor 6, purchased from VWR). The polymer was precipitated in hexanes:isopropyl ether (50:50) to yield a white solid having a number average molecular weight of 12,500 and weight average molecular weight of 35,000 (gel permeation chromatography, using hexafluoroisopropanol (HFIP) and poly(2-vinylpyridine) standards). The hydroxyl number (OH#) was determined by titration [OH#=54 mg KOH/g sample, hydroxyl equivalent weight (EW)=1,040 g/mol].

EXAMPLE 18

In a 4-liter beaker equipped with a mechanical stirring apparatus 143 gm (1.29 mol) of PVP (PVP K25, 30,000 molecular weight polymer, purchased from Fluka) was dissolved in 888 gm triethylene glycol. 48.7 gm (1.29 mol) of sodium borohydride (NaBH$_4$, VenPure AF granules, 98+%, purchased from Aldrich, Milwaukee, Wis.) was added to the PVP solution over a 1-hour period. Substantial bubbling was observed. The reaction was stirred at 110° C. for 5 hours. Distilled water (500 mL) was added to the hot reaction mixture. The polymer was dialyzed against distilled water for 5 days and 2-propanol for 2 days using 1000 molecular weight cut-off dialysis membrane. The polymer was precipitated in hexanes:isopropyl ether (50:50) to yield a white solid having a number average molecular weight of 8,000 and weight average molecular weight of 24,500 (gel permeation chromatography, using hexafluoroisopropanol (HFIP) and poly(2-vinylpyridine) standards). The hydroxyl number (OH#) was determined by titration [OH#=53.4 mg KOH/g sample, hydroxyl equivalent weight (EW)=1,050 g/mol].

EXAMPLE 19

In a 4-liter beaker equipped with a mechanical stirring apparatus 302 gm (2.72 mol) of PVP (PVP K30, 40,000 molecular weight polymer, purchased from Fluka) was dissolved in 2 L 2-propanol. 127 gm (3.35 mol) of sodium borohydride (NaBH$_4$, VenPure AF granules, 98+%, purchased from Aldrich, Milwaukee, Wis.) was added to the PVP solution over a 1-hour period. Substantial bubbling was observed. Tetrabutylammonium bromide (10.5 gm (32.6 mmol)) was added to the reaction mixture. The reaction was stirred at 60° C. for 6 hours and at room temperature for an additional 24 hours. The polymer was dialyzed against distilled water for 5 days then 2-propanol for 2 days using 1000 molecular weight cut-off dialysis membrane. The polymer was precipitated in hexanes:isopropyl ether (50:50) to yield a white solid having a number average molecular weight of 12,000 and weight average molecular weight of 34,500 (gel permeation chromatography, using hexafluoroisopropanol (HFIP) and poly(2-vinylpyridine) standards). The hydroxyl number (OH#) was determined by titration [OH#=29.1 mg KOH/g sample, hydroxyl equivalent weight (EW)=1900 g/mol].

EXAMPLE 20

In a 1-liter erlenmyer flask equipped with a magnetic stirrer 8.6 gm PVP—OH (54 mmol of monomer units, 3.1 mmol OH) having a number average molecular weight 3,000 and weight average molecular weight of 7,200 was dissolved in 500 mL 0.3 M $K_2CO_3$ (pH 11-12). 300 mg (0.56 mmol) of 5-(4,6-dichloro-s-triazin-2-ylamino)fluorescein-hydrochloride (DTAF.HCl, purchased from Fluka, Milwaukee, Wis.) was added to the PVP solution. The reaction mixture was stirred at ambient temperature for 4 hours and then poured into 1000 molecular weight cut-off dialysis membrane. The polymer was dialyzed against water for 48 hours, methyl alcohol for 48 hours, and isopropyl alcohol for 20 hours. The polymer was concentrated by rotary evaporation and then precipitated in isopropyl ether to yield an orange polymer (70% yield) having a number average molecular weight of 4,000 and weight average molecular weight of 8,500 (gel permeation chromatography, using hexafluoroisopropanol (HFIP) and poly(2-vinylpyridine) standards).

EXAMPLE 21

In a 1-liter erlenmyer flask equipped with a magnetic stirrer 6 gm (54 mmol) PVP—OH from Example 16 was dissolved in 500 mL 0.3 M $K_2CO_3$ (pH 11-12). 200 mg (0.37 mmol) of 5-(4,6-dichloro-s-triazin-2-ylamino)fluorescein-hydrochloride (DTAF.HCl, purchased from Fluka, Milwaukee, Wis.) was added to the PVP solution. The reaction mixture was stirred at ambient temperature for 4 hours and then poured into 1000 molecular weight cut-off dialysis membrane. The polymer was dialyzed against water for 40 hours, methyl alcohol for 40 hours, and isopropyl alcohol for 16 hours. The polymer was concentrated by rotary evaporation and then precipitated in hexanes:isopropyl ether (40:60) to yield an orange polymer (90% yield) having a number average molecular weight of 12,800 and weight average molecular weight of 34,500 (gel permeation chromatography, using hexafluoroisopropanol (HFIP) and poly(2-vinylpyridine) standards).

EXAMPLE 22

Figure 2:
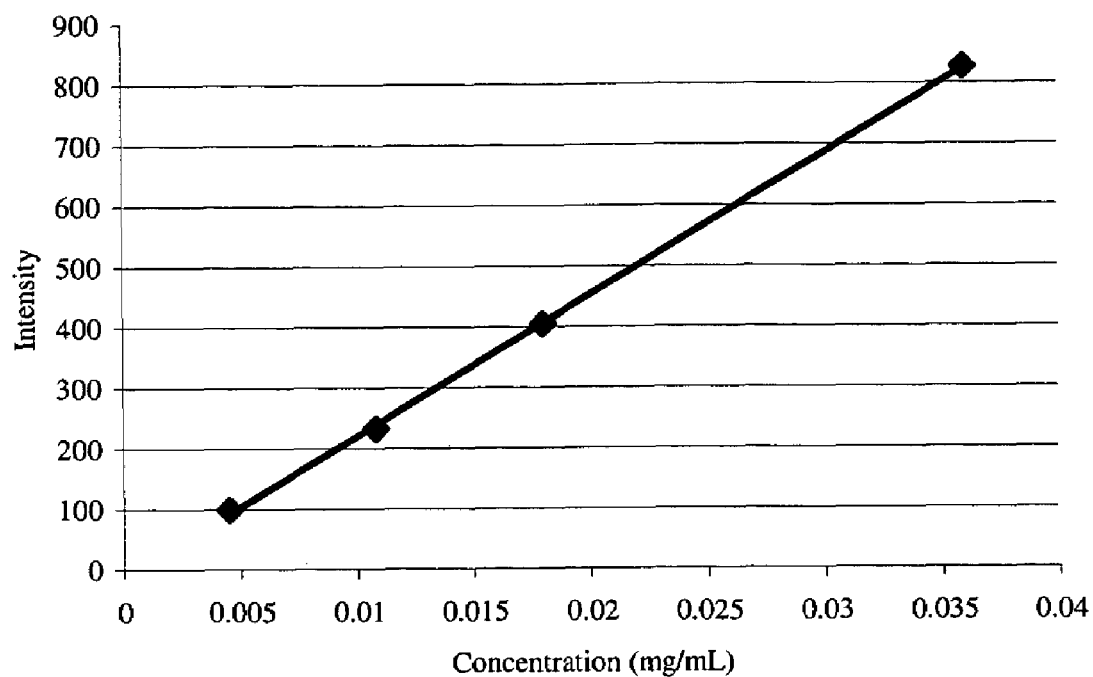
FIG. 2 is a graph showing the intensity as a function of concentration of a fluorescein-derived fluorecently labeled polymer of the present invention.

The fluorescently labeled polymer from Example 21 was dissolved in phosphate buffer solution (pH 7.4) and its fluorescence spectra recorded using a Shimadzu RF-5301PC Spectrofluorophotometer, using an absorption maximum of 500 nm, emission maximum of 520 nm, and slit width of 3 nm. The fluorescence excitation/emission spectra and standard calibration curve are shown in FIGS. 1 and 2, respectively, and the corresponding data is shown in Table 1, below.

TABLE 1

| Polymer (Example 21) PPM in PBS (pH 7.4) | Fluorescence Intensity (Ex. $lambda_{max}$ = 500 nm, Em. $lambda_{max}$ = 520 nm, Slit Width = 3 nm. |
|---|---|
| 4.5 | 100 |
| 10.8 | 232 |
| 18.0 | 405 |
| 35.9 | 827 |

EXAMPLE 23

Figure 3:
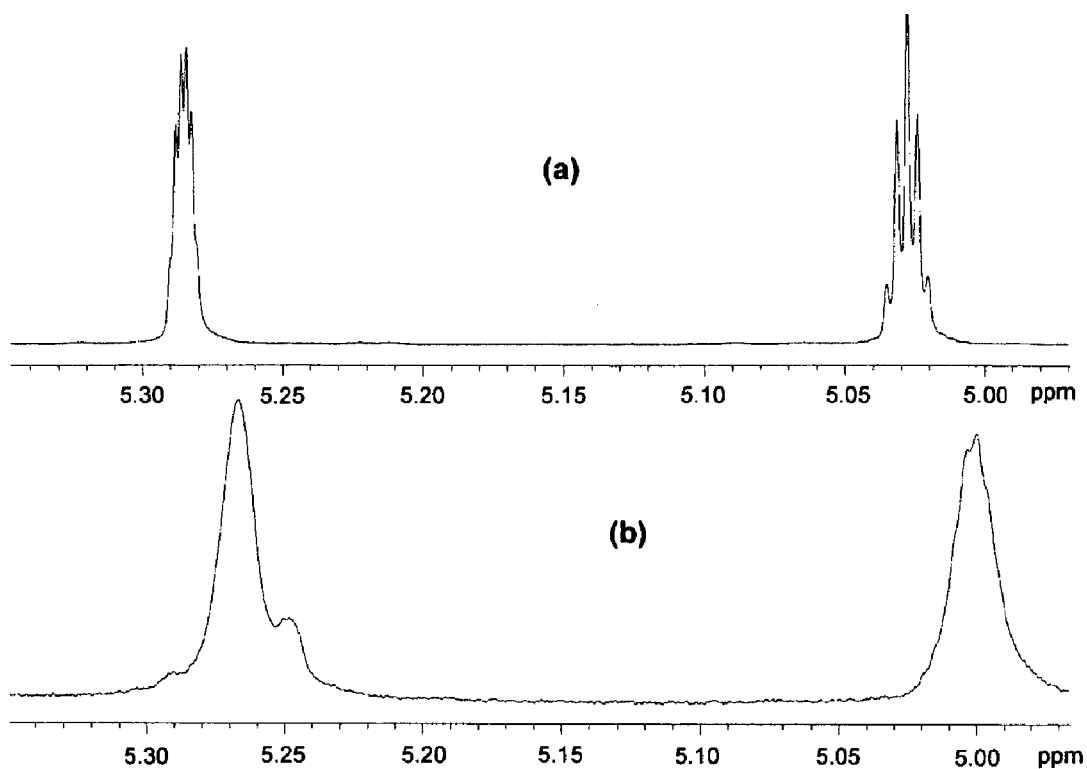
FIG. 3 shows the $^1$H NMR (CDCl$_3$) spectra (vinylic region) of (a) 3-isopropenyl-alpha,alpha-dimethylbenzyl isocyanate and (b) the reactive lactam polymer of Example 23.

In a 1-liter 3-neck round bottom flask equipped with a nitrogen inlet, rubber septum, and magnetic stir bar, 15.7 gm (141 mmol of monomer units, 15.0 mmol of OH) of PVP—OH from Example 18 was dissolved in anhydrous 1,4-dioxane (400 mL). 3-isopropenyl-alpha,alpha-dimethylbenzyl isocyanate (6.0 gm, 30 mmol) and approximately 10 milligrams hydroquinone was added to the polymer solution. Stannous octoate solution (50 microliter, 0.33 M in toluene) was added and the reaction flask was covered with aluminum foil. The reaction mixture was then stirred at 70° C. for 6 hours. The polymer was precipitated three times from diisopropyl ether to yield an off-white polymer having a number average molecular weight of 8,200 and weight average molecular weight of 24,900 (gel permeation chromatography, using hexafluoroisopropanol (HFIP) and poly(2-vinylpyridine) standards). $^1$H NMR spectroscopy confirmed the presence of 4 mol % covalently attached pendent photo-reactive groups. FIG. 3 shows the $^1$H NMR ($CDCl_3$) spectra of the vinylic region of (a) 3-isopropenyl-alpha,alpha-dimethylbenzyl isocyanate and (b) polymer from example 23. The significant peak broadening shown in FIG. 3 confirms that the 3-isopropenyl-alpha,alpha-dimethylbenzyl isocyanate was covalently attached to the PVP polymer.

EXAMPLE 24

Lenses were made using the procedure and reaction mixture described in Example 15, but with PVP-MIA (Example 12) in place of PVP-Methacrylate (Example 7). A study was carried out to quantify the percent release of the fluorescently labeled PVP derivative from 56 contact lenses using IPA as an extraction solvent. First, a study was carried out to determine the photo stability of PVP-MIA. A 6 percent by weight solution of PVP-MIA (in TAA) was irradiated with visible light (~4 mW/$cm^2$) for 10 minutes at ambient temperature. The fluorescence behavior of the fluorescently labeled polymer was unaffected by exposure to visible light radiation. PVP-MIA was therefore deemed appropriate for the quantitative determination of PVP-MIA using fluorescence spectroscopy. After the photo-crosslinking of the reactive monomer mixture, the resultant contact lenses were weighed. The weight of 56 lenses totaled 1.270 grams. The theoretical amount of PVP-MIA in the lenses was calculated as 54.4 mg. The lenses were extracted in 200 mL IPA/water (60 volume percent IPA) for 30 minutes to remove unwanted impurities such as unreacted monomers, then drained, and then immersed in 200 mL HPLC grade IPA. The percent release of PVP-MIA from lenses was measured using the standard calibration plot of PVP-MIA (mg/mL, in 100 percent IPA) as a function of fluorescent intensity (arbitrary units). The measurements were recorded using a Shimadzu RF-5301PC Spectrofluorophotometer, using an absorption maximum of 355 nm, emission maximum of 425 nm, and slit width of 3 nm. After 2, 3, and 17 hours in IPA, 3.6, 5.0, and 10.5 weight percent of the fluorescently tagged PVP (PVP-MIA) was released, respectively. A 10.5 weight percent release corresponds to 5.71 mg of the total 54.4 mg PVP-MIA in 56 contact lenses. A similar study was carried out using distilled water in place of IPA. Less than 0.1 weight percent of PVP-MIA was detected even after 1 month in distilled water.

EXAMPLE 25

In a 4-liter beaker equipped with a mechanical stirring apparatus 100 gm (0.9 mol of monomer units) of PVP (powder, average Mw ca. 10,000, Aldrich, Milwaukee, Wis.) was dissolved in 1.4 L 2-propanol. 17 gm (0.45 mol) of sodium borohydride ($NaBH_4$) was added to the PVP solution over a 1-hour period. Substantial bubbling was observed. The reaction was stirred at room temperature for 2 hours and then at 55° C. for 4 hours. 500 mL $H_2O$ was added and the reaction was stirred for an additional 2 hours at 55° C. and 16 hours at ambient temperature. The reaction mixture was poured into dialysis membrane (1000 MWCO) and dialyzed against deionized water for 5 days, methanol for 2 days, and isopropanol for 1 day. The resulting hydroxyl functionalized PVP polymer was isolated by removal of the solvents by rotary evaporation, yielding a white solid having a number average molecular weight of 6,700 and weight average molecular weight of 10,300 (gel permeation chromatography using hexafluoroisopropanol (HFIP) and poly(2-vinylpyridine) standards). The hydroxyl number was determined by titration (OH#=30.0 mg KOH/g sample, hydroxyl EW=1900 g/mol).

In a 1-liter 3-neck round bottom flask equipped with a nitrogen inlet, rubber septum, and magnetic stir bar 13.6 gm (122 mmol of monomer units, 7 mmol of OH) of the hydroxyl functionalized PVP polymer was dissolved in 600 mL of anhydrous 1,4-dioxane. 2-isocyanatoethyl methacrylate (0.95 gm, 6.1 mmol) and approximately 10 milligram of hydroquinone were added to the polymer solution. Stannous octoate solution (100 microliter, of 0.33 M in toluene) was added and the reaction mixture was then stirred at 70° C. for 6 hours. The resulting reactive PVP polymer was precipitated three times from diisopropyl ether to yield a white polymer having a number average molecular weight of 7,000 and weight average molecular weight of 10,000 (gel permeation chromatography using hexafluoroisopropanol (HFIP) and poly(2-vinylpyridine) standards). $^1H$ NMR ($D_2O$) spectroscopy confirmed the presence of ~3 mole % covalently attached methacrylate groups. Quantification of pendent methacrylate groups was carried out by integration of vinylic protons between 5.5-7.0 ppm relative to lactam ring protons between 1.0-4.0 ppm.

EXAMPLE 26

In a 20 mL amber vial, 30 weight % of SIMAA, 22 weight % mPDMS, 31 weight % DMA, 8.5 weight % HEMA, 0.75 weight % EGDMA, 1.5 weight % Norblock 7966, 0.25 wt % CGI 819 and 6 weight % of the reactive PVP polymer from Example 25) (based upon the total of all reactive components), were combined with 21 weight % tert-amyl alcohol, and 11 weight % low molecular weight PVP (2,500 molecular weight), make a reaction mixture. The reaction mixture was rolled on a jar roller until all components were dissolved and the reaction mixture was a clear, homogeneous solution. Polypropylene contact lens back curves were filled and closed with Zeonor front curves. The molds were irradiated with a total of 4 mW/$cm^2$ visible light over a 30-minute period at 55° C. in $N_2$. The molds were opened and the lenses were immediately released into distilled water at 90° C. and then transferred into packing solution. The lenses were autoclaved and tested for water content, modulus, % elongation and advancing dynamic contact angle. The results are shown in Table 3, below. The lenses felt lubricious when handled.

| Property | |
|---|---|
| DCA (° C.) | 54 |
| % H2O | 45 |
| Modulus (psi) | 110 |
| Elongation (%) | 124 |

Additionally, one lens was placed in 100% IPA for 60 minutes at room temperature and then allowed to reequilibrate in packing solution for at least about 1 hour. The lens retained its lubricious feel.

We claim:

1. A process comprising dissolving and reacting in a solvent at least one lactam polymer and a reducing agent to form a hydroxyl functionalized lactam polymer derivative comprising hydroxyl functionality randomly distributed throughout the polymer backbone.

2. The process of claim 1 wherein said solvent comprises at least one protic solvent.

3. The process of claim 2 wherein said protic solvent is selected from the group consisting of aqueous and alcoholic solvents.

4. The process of claim 2 wherein said solvent is selected from the group consisting of water, methanol, ethanol, 2-propanol, n-butanol, 1-pentanol, tert-amyl alcohol, glycerol and mixtures thereof.

5. The process of claim 1 wherein said solvent is present in amounts from about 50 to about 99 wt %, based upon all components in the reaction mixture.

6. The process of claim 1 wherein said solvent is present in amounts from about 70 to about 90 wt %, based upon all components in the reaction mixture.

7. The process of claim 1 wherein said reducing agent is sodium borohydride.

8. The process of claim 1 wherein said reducing agent is used in an amount from about 9 to about 50 mole % based upon the moles of lactam groups in said lactam polymer.

9. The process of claim 1 wherein said reacting step is conducted at a temperature between about 20 and about 120° C.

10. The process of claim 1 wherein said reacting step is conducted at a temperature between about 40 and about 90° C.

11. The process of claim 1 wherein said reacting step is conducted for up to about 2 days.

12. The process of claim 1 wherein said reacting step is conducted for a time of about 4 hours to about 24 hours.

13. The process of claim 1 wherein said reacting step is conducted in the presence of at least one catalyst.

14. The process of claim 13 wherein said catalyst is selected from the group consisting of metal salts, metal oxides, alkyl ammonium halides and combinations thereof.

15. The process of claim 13 wherein said catalyst is selected from the group consisting of lithium chloride, aluminum oxide, manganese dioxide, tetrabutyl ammonium bromide and mixtures thereof.

16. The process of claim 1 wherein said lactam polymer comprises at least about 10% repeating units derived from at least one lactam group.

17. The process of claim 16 wherein said at least one lactam group is selected from the group consisting of substituted and unsubstituted 4 to 7 membered lactam rings.

18. The process of claim 16 wherein said at least one lactam group is selected from the group consisting of unsubstituted 4 to 6 membered lactam rings.

19. The process of claim 16 wherein said at least one lactam group is selected from the group consisting of N-vinyl-2-pyrrolidone, N-vinyl-2-piperidone, N-vinyl-2-caprolactam, N-vinyl-3-methyl-2-pyrrolidone, N-vinyl-3-methyl-2-piperidone, N-vinyl-3-methyl-2-caprolactam, N-vinyl-4-methyl-2-pyrrolidone, N-vinyl-4-methyl-2-caprolactam, N-vinyl-5-methyl-2-pyrrolidone, N-vinyl-5-methyl-2-piperidone, N-vinyl-5,5-dimethyl-2-pyrrolidone, N-vinyl-3,3,5-trimethyl-2-pyrrolidone, N-vinyl-5-methyl-5-ethyl-2-pyrrolidone, N-vinyl-3,4,5-trimethyl-3-ethyl-2-pyrrolidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl-2-caprolactam, N-vinyl-7-ethyl-2-caprolactam, N-vinyl-3,5-dimethyl-2-caprolactam, N-vinyl4,6-dimethyl-2-caprolactam, N-vinyl-3,5,7-trimethyl-2-caprolactam, N-vinylmaleimide, vinylsuccinimide and mixtures thereof.

20. The process of claim 16 wherein said at least one lactam group comprises N-vinyl-2-pyrrolidone.

21. The process of claim 16 wherein said lactam polymer further comprises repeat units derived from at least one comonomer.

22. The process of claim 21 wherein said at least one comonomer is selected from the group consisting of methyl methacrylate, methacrylic acid, styrene, butadiene, acrylonitrile, 2-hydroxyethylmethacrylate, acrylic acid, methyl acrylate, methyl methacrylate, vinyl acetate, N,N-dimethylacrylamide, N-isopropylacrylamide and polyethyleneglycol monomethacrylates and combinations thereof.

23. The process of claim 21 wherein said at least one comonomer is selected from the group consisting of methacrylic acid, acrylic acid, acetonitrile and mixtures thereof.

24. The process of claim 1 wherein said lactam polymer comprises at least about 30% repeating units derived from at least one lactam group.

25. The process of claim 1 wherein said lactam polymer comprises at least about 50% repeating units derived from at least one lactam group.

26. The process of claim 1 wherein said reducing agent is present in an amount between about 3 and about 30 weight %.

* * * * *